(12) United States Patent
Li et al.

(10) Patent No.: US 10,446,329 B2
(45) Date of Patent: Oct. 15, 2019

(54) PROCESS OF FORMING ELECTRODES AND PRODUCTS THEREOF FROM BIOMASS

(71) Applicant: University of Virginia Patent Foundation, Charlottesville, VA (US)

(72) Inventors: Xiaodong Li, Charlottesville, VA (US); Zan Gao, Charlottesville, VA (US); Yunya Zhang, Charlottesville, VA (US)

(73) Assignee: UNIVERSITY OF VIRGINIA PATENT FOUNDATION, Charlottesville, VA (US)

( * ) Notice: Subject to any disclaimer, the term of this patent is extended or adjusted under 35 U.S.C. 154(b) by 0 days.

(21) Appl. No.: 15/274,557

(22) Filed: Sep. 23, 2016

(65) Prior Publication Data

US 2017/0084924 A1 Mar. 23, 2017

Related U.S. Application Data

(60) Provisional application No. 62/222,328, filed on Sep. 23, 2015.

(51) Int. Cl.
| | |
|---|---|
| *H01M 4/58* | (2010.01) |
| *H01G 11/26* | (2013.01) |
| *H01M 4/04* | (2006.01) |
| *H01G 11/86* | (2013.01) |
| *H01G 11/36* | (2013.01) |
| *H01G 11/40* | (2013.01) |

(Continued)

(52) U.S. Cl.
CPC ............ *H01G 11/26* (2013.01); *H01G 11/36* (2013.01); *H01G 11/40* (2013.01); *H01G 11/46* (2013.01);

(Continued)

(58) Field of Classification Search
None
See application file for complete search history.

(56) References Cited

U.S. PATENT DOCUMENTS

| | | | |
|---|---|---|---|
| 2002/0058179 A1* | 5/2002 | Segit | D21H 13/16 442/377 |
| 2007/0003837 A1* | 1/2007 | Nishimura | H01M 4/0404 429/232 |

(Continued)

*Primary Examiner* — Wyatt P McConnell
(74) *Attorney, Agent, or Firm* — Westerman, Hattori, Daniels & Adrian, LLP

(57) ABSTRACT

A flexible electrode comprises an activated cotton textile composite comprising activated carbon fibers, nickel sulfide nanoparticles and graphene and a process for making the flexible electrode. The process may comprise preparing a cotton textile containing $Ni(NO_3)_2$. Then, the cotton textile containing $Ni(NO_3)_2$ may be heated at a first temperature to produce an activated cotton textile composite comprising activated carbon fibers, nickel nanoparticles and graphene. The activated cotton textile composite may be then treated with sulfur to produce an activated cotton textile composite comprising activated carbon fibers, nickel sulfide nanoparticles and graphene. The nickel sulfide particles may be $NiS_2$ nanoparticles in a form of nanobowls, and distributed on a surface and inside the activated carbon fibers. The activated carbon fibers and the nickel sulfide nanoparticles may be coated with graphene. Banana peels may be activated and treated with the similar processes to form electrodes for both supercapacitor and battery applications.

25 Claims, 27 Drawing Sheets

(51) Int. Cl.
  *H01M 4/38* (2006.01)
  *H01M 4/62* (2006.01)
  *H01G 11/46* (2013.01)

(52) U.S. Cl.
  CPC .......... *H01G 11/86* (2013.01); *H01M 4/0416* (2013.01); *H01M 4/0471* (2013.01); *H01M 4/38* (2013.01); *H01M 4/5815* (2013.01); *H01M 4/5825* (2013.01); *H01M 4/625* (2013.01); *Y02E 60/13* (2013.01)

(56) References Cited

U.S. PATENT DOCUMENTS

| | | |
|---|---|---|
| 2011/0273662 A1 | 11/2011 | Hwang et al. |
| 2012/0244408 A1 | 9/2012 | Huang et al. |
| 2013/0222270 A1 | 8/2013 | Winkler et al. |
| 2013/0222271 A1 | 8/2013 | Alberth |
| 2014/0160055 A1 | 6/2014 | Margolis et al. |
| 2015/0016035 A1 | 1/2015 | Tussy |
| 2015/0025355 A1 | 1/2015 | Bailey et al. |
| 2015/0031348 A1 | 1/2015 | Lee et al. |
| 2015/0091781 A1 | 4/2015 | Yu |
| 2015/0130685 A1 | 5/2015 | Kim et al. |
| 2015/0138700 A1 | 5/2015 | Goyal et al. |
| 2015/0185766 A1 | 7/2015 | Otsuka et al. |
| 2015/0185944 A1 | 7/2015 | Magi et al. |
| 2015/0214555 A1* | 7/2015 | Visco .................. H01M 4/5815 429/347 |
| 2015/0234426 A1 | 8/2015 | Bailey et al. |
| 2015/0241917 A1 | 8/2015 | Seok et al. |
| 2015/0261946 A1 | 9/2015 | Yoon et al. |

* cited by examiner

PROCESS OF FORMING ELECTRODES AND PRODUCTS THEREOF FROM BIOMASS

CROSS-REFERENCE TO RELATED APPLICATIONS

This application claims the benefit of the filing date of U.S. Provisional Patent Application No. 62/222,328 filed on Sep. 23, 2015, the disclosure of which is hereby incorporated by reference.

GOVERNMENT INTEREST STATEMENT

This invention was made in whole or in part with government support under Grant CMMI-1418696 and CMMI-1358673.

FIELD OF THE INVENTION

This invention relates to electrodes, and more particularly, to a method for forming flexible electrodes and the products thereof from biomass materials such as cotton textile and banana peel.

BACKGROUND OF THE INVENTION

With the impending energy crisis and increasing environmental concerns, a worldwide imperative is to develop greener and more efficient energy conversion and storage devices with the goal of utilizing renewable and sustainable energy sources, such as solar, wind, geothermal and tidal energy. Lithium-ion batteries, as one of the most important energy storage devices, have revolutionized the modern society in all aspects, especially for consumer electronics and electric vehicles, because of their high energy density, light weight and long lifespan. To date, graphite is frequently used as an anode material, however, its low theoretical capacity (372 mAh $g^{-1}$) and unresolved safety issue hinder its practical application, especially for large-scale grid energy storage and sustainable transport. Many efforts have been made to develop electrode materials with superior capacity and longer lifespan to replace graphite. In this context, numerous anode materials including silicon, germanium, tin, transition metal oxides (i.e. $Co_3O_4$, $SnO_2$, NiO) and sulfides (i.e. NiS, $Ni_3S_4$, $SnS_2$, $CoS_2$, $Co_9S_8$, $FeS_2$) have been extensively explored as alternative anode materials, due to their remarkable theoretical capacities, high lithium activity, low cost and natural abundance. However, metal oxides and sulfides usually suffer from huge volume change and pulverization during $Li^+$ insertion-extraction process, which often lead to cracking, poor electronic conductivity or even fracture of the anode.

Compared with metal oxides, metal sulfides possess combinatory physical and chemical properties, such as higher electrical conductivity, better thermal stability, and richer redox chemistry, making them more promising for lithium-ion batteries. Among various metal sulfides, nickel sulfides have been well explored in a wide range of technical fields, including solar cell, hydrogen production, catalysis, optoelectronics, energy conversation and storage. For instance, NiS, $NiS_2$, $Ni_3S_2$, and $Ni_3S_4$ have gained special attention as electrode materials for lithium-ion batteries and supercapacitors.

A bulk electrode usually exhibits sluggish lithium ion diffusivity because of its low active surface area, which limits the inner capacitive contribution from active materials, thereby leading to poor power and energy density. Many efforts have been made to enhance the capacity and extend lifespan of lithium-ion batteries by either constructing nanostructures of metal sulfides on conductive porous carbon matrix or coating carbon onto metal sulfide nanoarchitectures. Recent studies have shown that the design wisdom of nanostructured active materials on conductive porous backbone (usually carbon) indeed pushes up energy and power outputs.

Many efforts have been made to develop safe, lightweight and flexible power sources to meet the urgent need for flexible/wearable electronics. Graphene has been recognized as an ideal substrate to hybridize active materials for high-performance energy storage devices because of its large surface area, ultra-high electrical conductivity, high flexibility, outstanding mechanical properties, and eminent chemical stability. To date, advances have been made in the synthesis of graphene-based, hybrid active materials for energy storage. The graphene in those hybrid electrodes serves as both conductive matrix and building blocks, forming a superstructure with interconnected conductive networks, which in turn facilities $Li^+$ ion transportation.

BRIEF SUMMARY

Accordingly, one example of the present invention is a process for making a flexible electrode. The process may comprise preparing a cotton textile containing $Ni(NO_3)_2$. Then, the cotton textile containing $Ni(NO_3)_2$ may be heated at a first temperature to produce an activated cotton textile composite comprising activated carbon fibers, nickel nanoparticles and graphene (ACT/Ni-graphene composite). The ACT/Ni-graphene composite may be then treated with sulfur to produce an activated cotton textile composite comprising activated carbon fibers, nickel sulfide nanoparticles and graphene (ACT/$NiS_2$-graphene composite). The activated carbon fibers may have a porous tubular structure. The nickel sulfide particles may be $NiS_2$ nanoparticles in a form of nanobowls.

Accordingly, another example of the present invention is an ACT/$NiS_2$-graphene composite. The ACT/$NiS_2$-graphene composite may comprise an activated cotton textile (ACT) composed of activated carbon fibers, nickel sulfide nanoparticles, and graphene. The nickel sulfide nanoparticles may be distributed on a surface and inside the activated carbon fibers. The activated carbon fibers and the nickel sulfide nanoparticles may be coated with graphene. The nickel sulfide nanoparticles may be $NiS_2$ nanoparticles in a form of nanobowls.

Accordingly, another example of the present invention is a flexible electrode comprising an ACT/$NiS_2$-graphene composite. When used as a binder-free electrode, the ACT/$NiS_2$-graphene electrode may exhibit an exceptional electrochemical performance including ultrahigh initial discharge capacity (~1710 mAh $g^{-1}$ at 0.01 C), magnificent rate performance (the discharge capacitance retained at ~645 mAh $g^{-1}$ at 1 C after 100 cycles) and excellent cyclic stability (the discharge capacitance recovered to ~1016 mAh $g^{-1}$ at 0.1 C after 400 cycles). The multiscale porous architectures of ACT/$NiS_2$-graphene hybrid electrode may not only buffer the volume change but also shorten the $Li^+$ ion diffusion paths during the lithiation-delithiation process. The conductive graphene coating on the ACT may serve as an "expressway" for electron transfer.

Accordingly, another example of the present invention is a process to convert waste banana peels into conductive porous carbon scaffolds. First, a piece of banana peel may be freeze dried to preserve the natural porous structure. A following-up high temperature annealing process may convert the freeze dried banana peel into activated banana peel (ABP). The hierarchically porous architectures of ABP scaffolds may be ideal backbones for electrochemical active materials. Then, urchin-like $NiCo_2O_4$ nanowires and sulfur nanoparticles may be anchored on the conductive ABP scaffolds to prepare high-performance electrode materials for supercapacitors and batteries, respectively.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
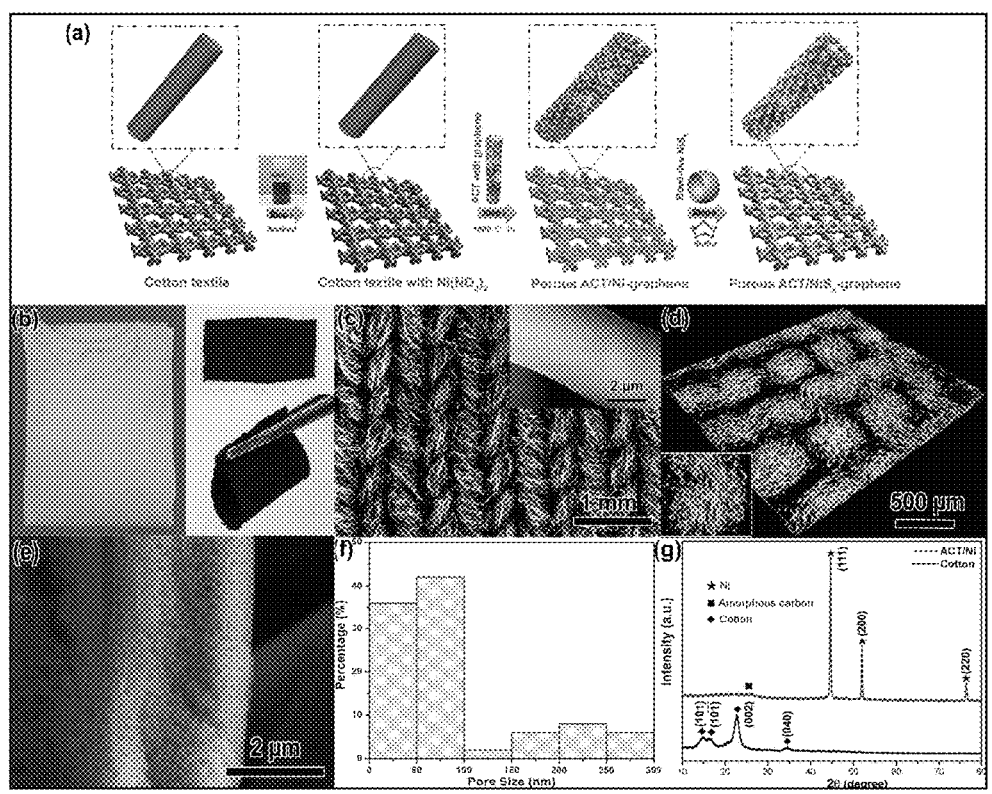
FIG. 1 shows synthesis and characterization of ACT/Ni-graphene composite, (a) Schematically Illustration of the fabrication process of porous $ACT/NiS_2$-graphene composite; (b) Optical photograph of a commercial cotton T-shirt, a piece of ACT/Ni-graphene under normal and folded state, showing its high flexibility; (c) SEM image of cotton textile, inset is the amplified SEM image of a cotton fiber; (d) XCT images of ACT/Ni-graphene composite after removing the Ni nanoparticles by using 2 M $HNO_3$, inset is the amplified region; (e) SEM image and (f) corresponding size distribution of porous ACT fibers after removing the Ni nanoparticles; (g) XRD patterns of cotton T-shirt textile and ACT/Ni-graphene composite.

The present invention is described with reference to embodiments of the invention. Throughout the description of the invention reference is made to FIGS. 1-27. When referring to the figures, like structures and elements shown throughout are indicated with like reference numerals.

The following terms, used in the present description and the appended claims, have the following definition.

The term "cotton textile" refers to a textile fabric composed of cotton fibers or other cellulose-based fibers.

The term "nanoparticle" refers to a particle having a size between 1 and 100 nanometers.

One example of the present invention is a process for making a flexible electrode. The process may comprise preparing a cotton textile containing Ni(NO₃)₂. Then, the cotton textile containing Ni(NO₃)₂ may be heated at a first temperature to produce an ACT/Ni-graphene composite. The ACT/Ni-graphene composite may be then treated with sulfur to produce an ACT/NiS₂-graphene composite. The activated carbon fibers may have a porous tubular structure. The nickel sulfide particles may be NiS₂ nanoparticles. These NiS₂ particles may be in a form of nanobowls.

In one embodiment, the cotton textile containing Ni(NO₃)₂ may be prepared by dipping a cotton textile into a Ni(NO₃)₂ solution with a concentration within a range of 0.01 M to 2 M, preferably 0.5 M to 1 M. The cotton textile may be dipped into the Ni(NO₃)₂ solution for at least 5 minutes, preferably at least 10 minutes.

In producing an ACT/Ni-graphene composite, the cotton textile containing Ni(NO₃)₂ may be heated at a first temperature. In one embodiment, the cotton textile containing Ni(NO₃)₂ may be heated at a first temperature within a range of 800° C. to 1100° C., preferably within a range of 900° C. to 1000° C. In another embodiment, the cotton textile containing Ni(NO₃)₂ may be heated at the first temperature under an inert environment for a time within a range of 60 to 120 minutes, preferably 60 to 90 minutes.

The ACT/Ni-graphene composite may be then treated with sulfur to be transformed into an ACT/NiS₂-graphene composite. In one embodiment, the ACT/Ni-graphene composite may be first coated with a layer of sulfur. Then, the ACT/Ni-graphene composite with sulfur may be heated at a second temperature to produce an ACT/NiS₂-graphene composite.

In one embodiment, the coating of the ACT/Ni-graphene composite with sulfur may be performed by dropping a solution comprising sulfur onto a surface of the ACT/Ni-graphene composite. An amount of the sulfur may be at least two times of an amount of nickel by weight on the coated ACT/Ni-graphene composite. In another embodiment, the ACT/Ni-graphene composite with sulfur may be heated at a second temperature within a range of 155 to 158° C. for a time within a range of 10 hours to 12 hours.

FIG. 1a schematically illustrates a fabrication procedure of an ACT/NiS₂-graphene composite in accordance with one embodiment of the present invention. In one embodiment, a piece of cotton textile may be first dipped into a Ni(NO₃)₂ solution, and then dried in an oven to obtain Ni(NO₃)₂ loaded cotton textile (Step I). The Ni(NO₃)₂ loaded cotton textile may be transferred into a tube furnace and heated at 1000° C. with argon protection for 1 hour to obtain an ACT/Ni-graphene composite (Step II).

Without being held to a particular theory, we believe that, during the activation process, many gaseous products including CH₄, H₂, CO, CO₂ may be formed by the thermal pyrolysis of cotton cellulous. The Ni(NO₃)₂ may be decomposed into NiO, then reduced to Ni nanoparticles which are embedded in the ACT fibers. Such ACT fibers may exhibit porous tubular structure embedded with Ni nanoparticles and wrapped with graphene sheets which are formed spontaneously during the activation process. The chemical reactions involved in such thermal decomposition process can be expressed with the following equations:

$$Ni(NO_3)_3 \rightarrow NiO + 2NO_2 \qquad (1)$$

$$NiO + H_2 \rightarrow Ni + H_2O \qquad (2)$$

$$NiO + CO \rightarrow Ni + CO_2 \qquad (3)$$

$$CH_4 \xrightarrow{Ni} C(graphene) + 2H_2 \quad (4)$$

Without being held to a particular theory, we believe that the formation of graphene originates from the dissolution of C atoms (obtained from the methane thermal decomposition) into the nickel at high temperature. During the cooling process, those carbon atoms precipitate out and segregate at the nickel surface to form graphene. Those graphene sheets, serving as current "expressways", may bridge the electrolyte and active electrode material, enabling higher current collection efficiency and faster $Li^+$ ion transport.

The obtained ACT/Ni-graphene composite may be then thermally treated with sulfur at 156° C. for 10 hours to synthesize an ACT/NiS$_2$-graphene composite (Step III). The amount of the added sulfur may be two times of the Ni on the ACT. A following-up annealing process at 200° C. may be used to remove residual sulfur in the ACT/NiS$_2$0graphene composite. Finally, open-arc-shaped NiS$_2$ nanobowls may be anchored on the ACT surface and embedded inside ACT fibers. Such ACT/NiS$_2$-graphene composite may be directly used as a binder-free flexible electrode for lithium-ion batteries. The "dead volume" of electrode materials due to the degradation of conductive agents and binders during charge/discharge processes could be overcome. Such open NiS$_2$ nanostructures together with graphene sheets on porous ACT tubular fibers may shorten $Li^+$ ion diffusion path, facilitate charge transfer and effectively accommodated the volume change of NiS$_2$ during the $Li^+$ ion insertion-desertion process, jointly improving the rate performance and cyclic stability of lithium-ion batteries.

Another example of the present invention is an activated cotton textile composite (ACT composite). The ACT composite may comprise an activated cotton textile composed of activated carbon fibers; nickel sulfide nanoparticles; and graphene. The nickel sulfide nanoparticles may be distributed on a surface and inside the activated carbon fibers. The activated carbon fibers and the nickel sulfide nanoparticles may be coated with graphene. In one embodiment, the ACT composite may be an ACT/NiS$_2$-graphene composite. The nickel sulfide nanoparticles may be NiS$_2$ nanoparticles in a form of nanobowls. The NiS$_2$ particles may have an average size within a range of 50 to 300 nm, preferably 100 and 200 nm. The ACT/NiS$_2$-graphene composite may have a BET surface area of at least 500 m$^2$ g$^{-1}$. The ACT/NiS$_2$-graphene composites are porous, and may have pores having a size distribution ranging from 2 to 32 nm, and an average pore radius of about 5 to 15 nm. A mass loading of the nickel sulfide nanoparticles and the graphene on the ACT/NiS$_2$-graphene composite may be in a range of 25 to 30 percent by weight.

Another example of the present invention is a flexible electrode comprising the ACT/NiS$_2$-graphene composite. The flexible electrode may have an initial discharge capacity of at least 1710 mAh g$^{-1}$ at a rate of 0.01 C, a discharge capacitance of at least 608 mAh g$^{-1}$ after 100 cycles at a rate of 1 C, and a recovered discharge capacitance of at least 1016 mAh g$^{-1}$ after 400 cycles at a rate of 1 C. In one embodiment, a flexible battery employing the flexible electrode may be fabricated.

In one embodiment, an ACT composite comprising porous ACT tubular fibers embedded with NiS$_2$ nanobowls and wrapped with graphene sheets is fabricated. As a self-supported electrode material, the assembled ACT/NiS$_2$-graphene cell may exhibit an exceptional electrochemical performance in terms of ultra-high capacity, impressive cyclic stability and excellent rate capability. The cell may achieve an ultrahigh initial capacity of ~1710 mAh g$^{-1}$ at a rate of 0.01 C, and maintain a high reversible capacity of ~1016 mAh g$^{-1}$ after 400 cycles at the rate of 0.1 C.

In one embodiment, a thin, lightweight, and flexible ACT/NiS$_2$ lithium-ion battery may also be assembled in its application for flexible energy storage devices. The flexible battery may have enhanced capacity and extended lifespan. The flexible battery may be used as any apparel or accessory to be worn; as well as implemented (i.e., disposed on, within, or in communication therewith) with any structure, device, system, electronics, circuit, machine, vehicle, craft, robot, carpet, pad, tile, equipment, surface, housing, conduit, or substrate (i.e., other than apparel or accessory, for example). The apparel and accessory may include any clothing (e.g., shirt, pants, vest, shorts, belt, holster, band, dress, skirt, jacket, coat, pad, shield, armor, etc.), hat, helmet, watch, glasses, shield, goggles, ring, prosthesis, medical implant or other implant, contact lenses, jewelry, shoes, collar, blanket, or any article in contact with or in communication with a subject (such as a human, animal, reptile, or rodent). The flexible battery may also be applied for any personal, professional, medical, military, construction, telecommunications, video gaming, or leisure application(s), implementation(s), or use(s).

Without being held to a particular theory, we believe that the superior cyclic performance, excellent rate capacity and exceptional flexibility of the as-prepared ACT/NiS$_2$-graphene electrode can be ascribed to the following merits: (1) porous ACT fibers may effectively buffer the stress induced by the volume change and maintain the structure stability during the electrochemical reaction; (2) the tubular structure of ACT fibers may serve as an electrolyte reservoir, shortening the transportation/diffusion path for lithium ions and enabling faster kinetics and high-rate capability; and (3) the NiS$_2$ nanobowls with interior and exterior arc surfaces may not only increase the specific surface areas to facilitate the penetration of electrolyte ions, but also stand for more stresses to enable the structure integrity during the charge/discharge process. In other words, the synergistic effects of individual components in the ACT/NiS$_2$-graphene composite may enable the fast ion/electron transfer, thereby leading to the exceptional electrochemical performances.

Another example of the present invention is a simple and low cost two-step procedure developed to convert waste banana peels into conductive porous carbon scaffolds. In one embodiment, first, a piece of banana peel may be freeze dried to preserve the natural porous structure. A following-up high temperature annealing process may convert the freeze dried banana peel into activated banana peel (ABP). The hierarchically porous architectures of ABP scaffolds may be ideal backbones for electrochemical active materials. Urchin-like NiCo$_2$O$_4$ nanowires and sulfur nanoparticles may be anchored on the conductive ABP scaffolds to prepare high-performance electrode materials for supercapacitors and batteries, respectively. The assembled asymmetric supercapacitors based on functionalized ABP may exhibit superior energy density and rate capacity. The hierarchically porous structure with nanopores may be created by annealing the Ni(NO$_3$)$_2$ solution-treated ABP, which displays high utilization of sulfur and outstanding electrochemical performance for lithium-sulfur (Li—S) batteries. The synergetic effects between carbon scaffolds and active materials may enable the superior electrochemical performance and utilization of active materials (NiCo$_2$O$_4$ and sulfur) for both supercapacitor and Li—S battery applications. Considering the unparalleled economic and social benefits of recycling waste banana peels, banana-peel derived porous carbon electrodes can pave the way to new low-cost energy storage devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Hereinafter, the present invention will be described in more detail with reference to Examples. However, the scope of the present invention is not limited to the following examples.

EXAMPLES

Preparation of Flexible ACT/NiS$_2$-Graphene Hybrid Anode Electrode

Fabrication of ACT/Ni-graphene composite: All chemicals were used after purchasing without further purification. Prior to the activation, a commercial cotton T-shirt was cleaned by distilled water in an ultrasonic bath. A piece of cotton T-shirt made of woven cotton fibers was firstly dipped into a Ni(NO$_3$)$_2$ solution and kept for 10 minutes. Then, the wet textile soaked with Ni(NO$_3$)$_2$ was dried in a pre-heated electronic oven at 80° C. for 6 hour to remove the residual water. The Ni(NO$_3$)$_2$-treated cotton textiles were put into a horizontal tube furnace and heated at 1000° C. (heating rate 5° C./min) for 1 hour with 300 sccm (standard cubic centimeter) gas flow of argon. Finally, the as-prepared ACT/Ni-graphene composite was washed with distilled water several times to remove the residual Ni(NO$_3$)$_2$, and dried at 80° C. overnight for further usage.

To study the effect of concentration of Ni(NO$_3$)$_2$ on Ni particle size and distribution, the concentration of Ni(NO$_3$)$_2$ solution was varied from 0.01 M to 2 M. ACT/Ni-0.01, ACT/Ni-0.5, ACT/Ni-1 and ACT/Ni-2 were used to name the composites obtained at the reactant concentration of 0.01 M, 0.5 M, 1 M and 2 M, respectively. The mass of Ni on ACT can be calculated by the difference of ACT/Ni-graphene composite and pure ACT.

Transformation of Ni Nanoparticles into NiS$_2$ Nanobowls: The flexible ACT/NiS$_2$-graphene composite was obtained by thermally treating ACT/Ni-graphene composite with sulfur. A piece of ACT/Ni-graphene composite was first cut into small rectangular piece with a size of 1.5 cm×2 cm, and coated with a thin layer of sulfur.

To homogeneously coat ACT/Ni-graphene fibers with sulfur, sulfur was first placed into distilled water and dispersed by shear stirring at 3000 r/min for 30 min. Such sulfur solution was then dropped onto a surface of ACT/Ni-graphene pieces and dried at 80° C. for 6 hour, and transferred into a sealed autoclave at 156° C. for 10 hour to facilitate sulfur diffusion and reaction with Ni nanoparticles. After such thermal treatment, NiS$_2$ nanobowls were homogeneously coated on and embedded inside the ACT fibers to form an ACT/NiS$_2$-graphene composite. To remove the residual sulfur, the ACT/NiS$_2$-graphene composite was heated at 200° C. for 2 hour.

In the present invention, we thermally treated ACT/Ni-graphene-0.5 with sulfur to obtain ACT/NiS$_2$-graphene composite (for simplicity we name ACT/NiS$_2$-graphene-0.5 as ACT/NiS$_2$-graphene) for electrochemical characterization and battery assembly. Finally, the ACT/NiS$_2$-graphene composite was punched into circular electrode with a diameter of 14 mm. The loading of NiS$_2$-graphene on the final ACT/NiS$_2$-graphene electrode was calculated by weighing the ACT/NiS$_2$-graphene and ACT circular electrode with the same size. The mass of ACT per area is 4.9 mg cm$^{-2}$. The mass loading of ACT/NiS$_2$-graphene is 1.5 mg cm$^{-2}$.

Activation of Banana Peels

Banana peels were cut into pieces and frozen in a freezer without further treatment. The frozen pieces were then lyophilized in a freeze dryer for 3 hours. Next, the freeze-dried pieces were inserted into a horizontal tube furnace and heated at 900° C. for 1 hour with continuous argon gas flow to convert the banana peel pieces into activated carbon. Finally, the activated banana peel (ABP) pieces were washed with distilled water several times and subsequently dried at 75° C. for 2 hours.

Fabrication of ABP Based Supercapacitors and Li—S Batteries

A mild hydrothermal process was used to grow NiCo$_2$O$_4$ nanowires on ABP to obtain high performance ABP/NiCo$_2$O$_4$ electrode material for supercapacitor application. Typically, 0.145 g of Ni(NO$_3$)$_2$.6H$_2$O, 0.0725 g of Co(NO$_3$)$_2$.6H$_2$O, and 0.45 g of urea were dissolved in 40 mL of distilled water to form a light pink solution. The solution was then transferred into a 50 mL Teflon-lined stainless steel autoclave and a piece of ABP was vertically suspended in the solution. The autoclave was kept at 120° C. in an electric oven for 3 hours. Finally, the products were taken out and washed with distilled water several times before being dried at 75° C. for 2 hours, after which they were annealed at 350° C. in an Argon atmosphere for 2 hours to produce NiCo$_2$O$_4$ nanowires. For the three-electrode system, the synthesized ABP and ABP/NiCo$_2$O$_4$ were directly used as working electrodes, a piece of platinum foil (1 cm×2 cm) and a saturated calomel electrode (SCE) were used as the counter and reference electrodes, respectively, and 6 M aqueous KOH was used as an electrolyte. Asymmetric supercapacitors were assembled by using the ABP/NiCo$_2$O$_4$ as the positive electrode, ABP as the negative electrode, stainless steel foil as the current collector and polyvinyl alcohol (PVA)/KOH gel film as both the separator and electrolyte (see the inset in FIG. 21f). The PVA/KOH gel was obtained by mixing 3 grams of KOH and 6 grams of PVA in 60 mL of deionized water at 80° C. under stirring until the solution became clear. The solution was then poured onto a flat petri dish to form a thin KOH/PVA film via natural solidification.

For the fabrication of lithium-sulfur batteries, ABP pieces were immersed into 0.3 M Ni(NO$_3$)$_2$ solution and then dried at 75° C. for 2 hours. The Ni(NO$_3$)$_2$ treated pieces were heated at 1000° C. with the protection of inert gas to create nanopores and graphene wrapped Ni nanoparticles on the cell walls of ABP. Sulfur was deposited onto the ABP/Ni/graphene by heating the sulfur-loaded ABP/Ni/graphene at 155° C. for 12 hours and then at 200° C. for 2 hours in a sealed Teflon-lined stainless steel autoclave. The electrolyte was produced by dissolving 1 mol/L LiTFSI and 1 mol/L LiNO$_3$ in an organic solvent of dimethoxyethane (DME)+1,3-dioxolane (DOL) at a 1:1 volume ratio. Lithium metal was used as anode and Celgard 2400 film as separator. The CR2032 coin cell was assembled with a MTI MSK-110 crimping machine in an argon-filled glove box (M. Braun, Germany) with oxygen and water contents below 1 and 0.1 ppm, respectively.

Characterization Methods

A PANalytical X'Pert Pro Multi-Purpose Diffractometer (MPD) equipped with Cu $K_\alpha$ radiation ($\lambda$=0.15406 nm) was used to determine the crystallographic structure of the synthesized materials. Raman measurements were carried out using a Renishaw InVia Raman microscope at 514 nm (with 5% Laser Power). The microstructure of the as-prepared samples was characterized by scanning electron microscopy (SEM; FEI Quanta 650) and transmission electron microscopy (TEM; JEOL 2000FX), high resolution transmission electron microscopy (HRTEM, FEI Titan), atomic force microscopy (AFM; Dimension Icon with ScanAsyst, Bruker) and X-ray computed tomography (XCT, Xradia MicroXCT-200). The specific area and pore size of ABP and its electrodes were measured using a Quantachrom Autosorb iQ nitrogen adsorption-desorption analyzer and measured with the Brunauer-Emmett-Teller (BET) theory.

Electrochemical Characterization of Electrodes

The electrochemical properties of the ACT/$NiS_2$-graphene composite were measured using CR2032 coin cells with lithium metal as an anode and Celgard 2400 film as a separator. The flexible ACT/$NiS_2$-graphene was used directly as the cathode material without using any conductive agent and binder. The electrode was first punched into circular disks with a diameter of 14 mm, and dried at 60° C. for 24 hour in a vacuum electronic oven. To further demonstrate its potential for constructing flexible energy storage devices, a piece of nanostructured ACT/$NiS_2$-graphene (1 cm×2 cm) was used as the flexible cathode to assemble flexible lithium-ion battery, together with a piece of lithium film as anode and Celgard 2400 as separator, respectively. The electrolyte solution was 1 M $LiPF_6$ in EC+DMC+DEC organic solvent (1:1:1 in volume, from MTI corporation). Both the CR2032 coin cell and flexible lithium-ion cell were assembled in an argon-filled glove box (Mbraun, Germany) with oxygen and water contents below 0.1 and 0.1 ppm, respectively. A LAND CT2003A battery test instrument was used to perform galvanostatic charge/discharge measurements between 1.0-3.0 V. The specific capacities and charge/discharge rates were calculated based on the active $NiS_2$-graphene on the ACT. A CHI 660E electrochemical workstation was used to do the cyclic voltammograms (CV) and electrochemical impedance spectroscopy (EIS) in the frequency range from 100 kHz to 0.05 Hz with an AC perturbation of 5 mV.

The electrochemical properties of supercapacitor electrodes were measured with both three-electrode and two-electrode electrochemical systems using a CHI 660E electrochemical workstation. Cyclic voltammetry (CV) was performed at scan rates ranging from 10 to 50 mV $s^{-1}$. Galvanostatic (GV) charge/discharge curves were obtained at different current densities. Electrochemical impedance spectra (EIS) were measured in the frequency range from 100 KHz to 1 Hz with an AC perturbation of 5 mV. ABP based Li—S batteries were assembled using a CR2032 coin cell. A LAND CT2003A battery test instrument was used to perform galvanostatic charge/discharge measurements. The CV and EIS in the frequency range from 100 kHz to 1 Hz with an AC perturbation of 5 mV were performed with a CHI 660E electrochemical workstation.

Results

The cotton textile may be comprised of cotton fibers with diameters ranging from about 5 to 10 μm (FIG. 1c). The ACT/Ni-graphene composite, converted from the cotton textile, was mechanically flexible (FIG. 1b). X-ray computed tomography (XCT) is a nondestructive technique to visualize interior features within solid objects by 3D reconstructing the inner structure mathematically from the measured data. FIG. 1d shows the reconstructed 3D images of ACT/Ni-graphene, revealing ACT's tubular fibers. To investigate the distribution of Ni nanoparticles in the ACT/Ni-graphene composite, the Ni nanoparticles were removed by using 2 M $HNO_3$ under 120° C. for 2 hour. FIG. 1e shows the SEM image of the ACT fibers after removing the Ni nanoparticles, revealing small pores on the ACT surface and inside ACT fibers. Most of the pores had diameters less than 100 nm (FIG. 1f). The tiny mesopores together with the tubular ACT fibers may serve as a reservoir for electrolyte ions, providing channels for $Li^+$ ion diffusion and space for accommodating volume change of active materials during the charging/discharging processes. FIG. 1g shows XRD patterns of the cotton textile and ACT/Ni-graphene composite. After activation, cotton's characteristic (101), (002) and (040) peaks disappeared, instead a broader diffraction peak at around 21° pointing toward amorphous carbon and nickel's (111), (200) and (220) peaks appeared in the XRD spectrum.

Figure 2:
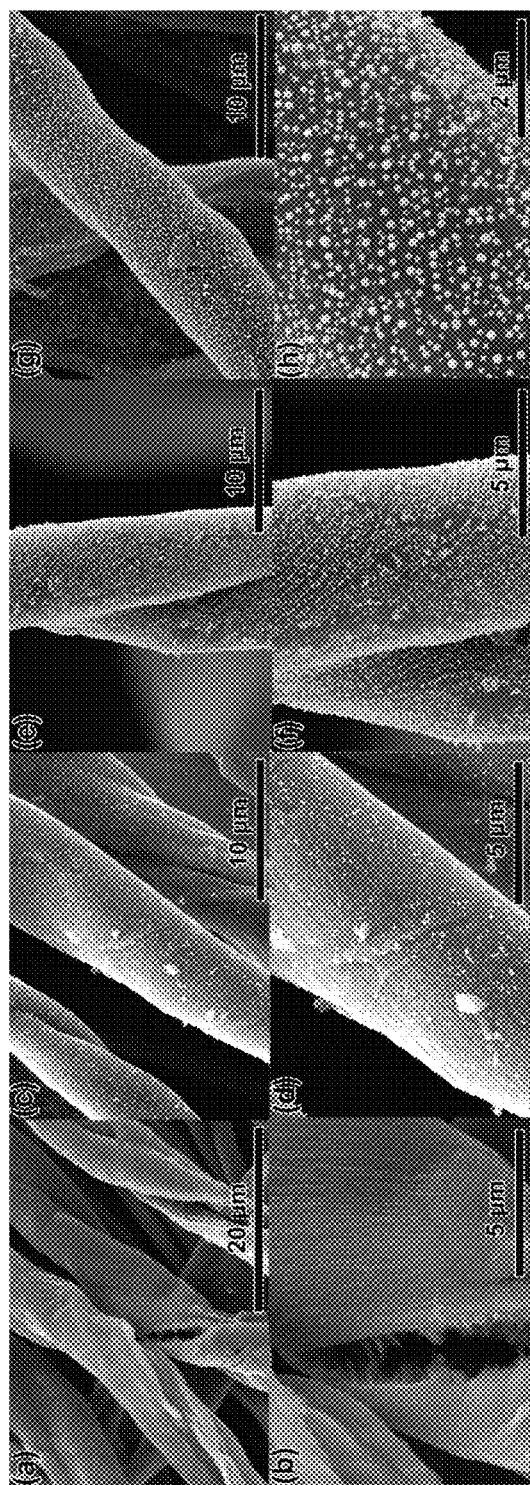
FIG. 2 shows SEM images of ACT/Ni-graphene composites obtained at various $Ni(NO_3)_2$ concentrations, (a) and (b) 0.01 M; (c) and (d) 0.5 M; (e) and (f) 1 M; (g) and (h) 2 M.
Figure 3:
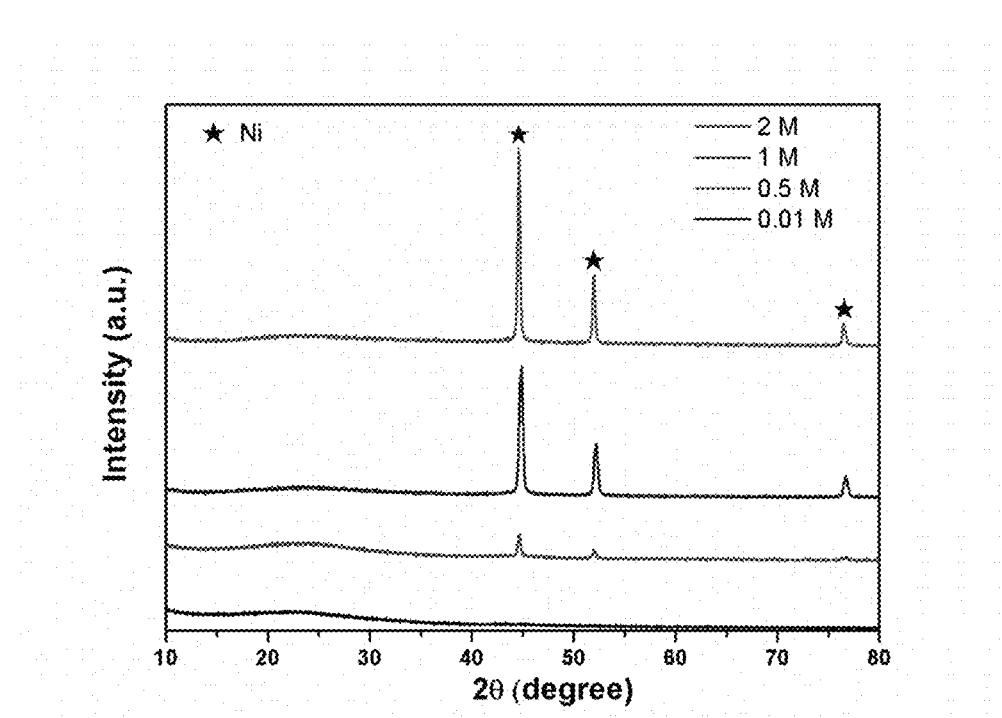
FIG. 3 shows XRD patterns of ACT/Ni-graphene composites obtained at the $Ni(NO_3)_2$ concentration of 0.01 M, 0.5 M, 1 M, and 2 M.
Figure 4:
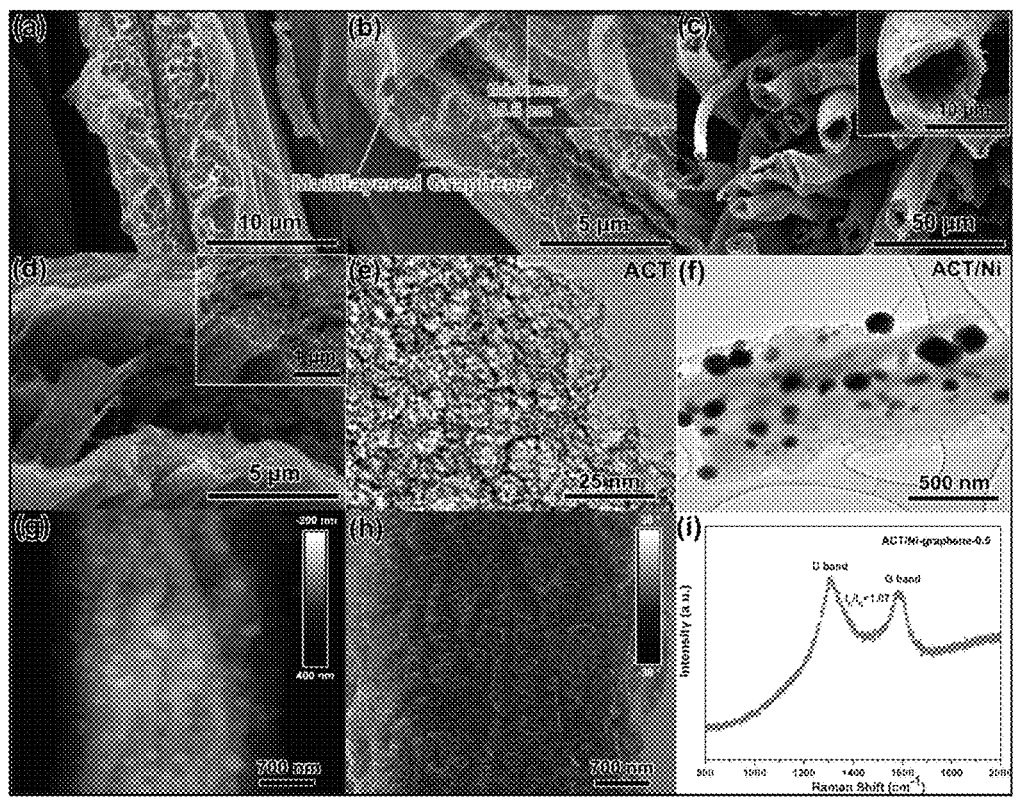
FIG. 4 shows microstructure of the as-prepared ACT/Ni-graphene-0.5 composite, (a) and (b) SEM images of ACT/Ni-graphene-0.5 composite at different magnifications; (c) and (d) Cross-sectional SEM images of ACT/Ni-graphene-0.5 composite at different magnifications, insets are the corresponding amplified regions; (e) TEM image of ACT alone; (f) TME image of ACT/Ni-graphene-0.5; (g) AFM height and (h) corresponding phase images of ACT/Ni-graphene-0.5 composite; (i) Raman spectrum of ACT/Ni-graphene-0.5.
Figure 5:
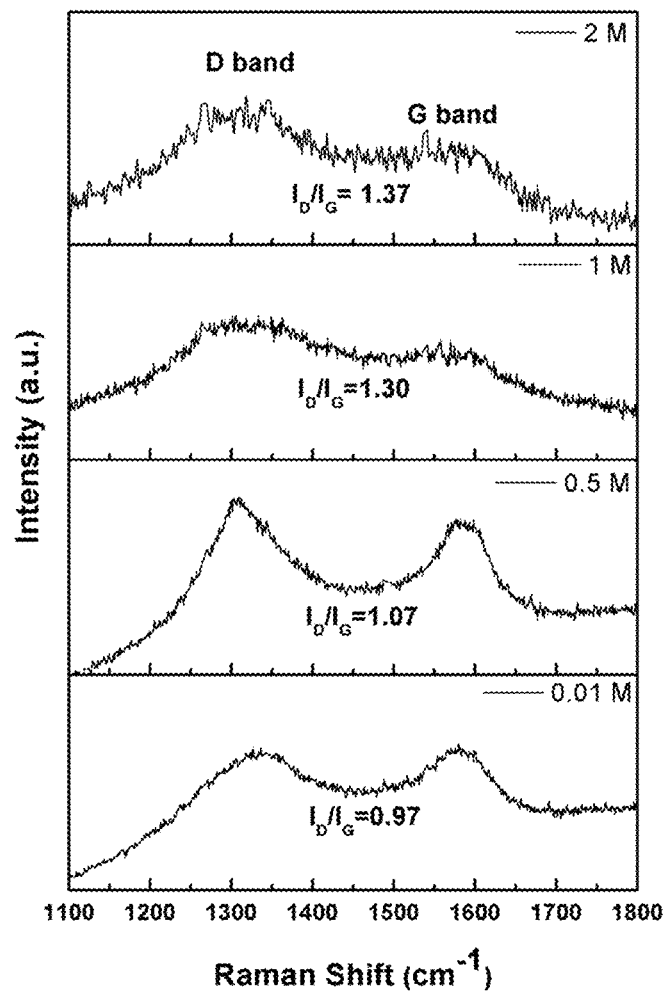
FIG. 5 shows Raman spectra of ACT/Ni-graphene composites obtained at the $Ni(NO_3)_2$ concentration of 0.01 M, 0.5 M, 1 M, and 2 M, respectively.
Figure 6:
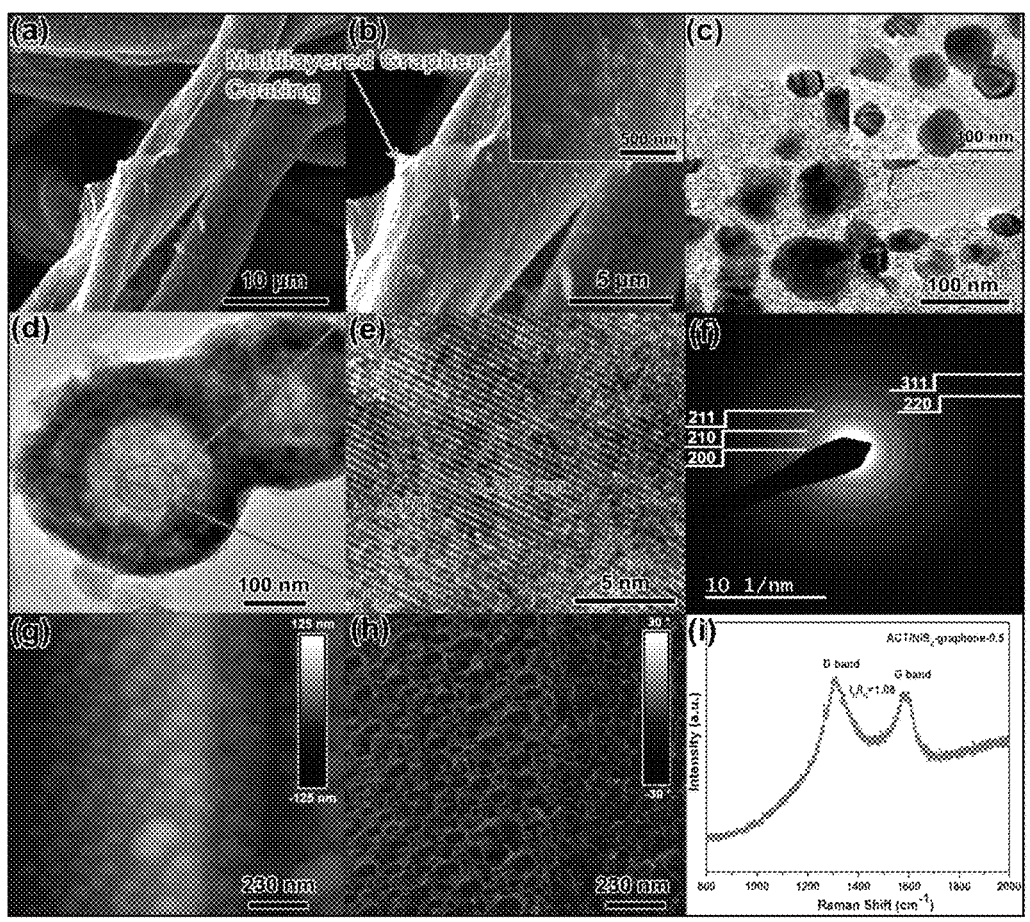
FIG. 6 shows microstructure of the as-prepared $ACT/NiS_2$-graphene composite, (a) and (b) SEM images of $ACT/NiS_2$-graphene composite at different magnifications, inset of b is the corresponding amplified region; (c) TEM images of $ACT/NiS_2$-graphene, inset of c is amplified region; (d) and (e) TEM images of $NiS_2$ nanobowls on ACT; (f) Selected area electron diffraction (SAED) pattern of the $NiS_2$ nanobowl; (g) AFM height and corresponding phase; (h) images of $ACT/NiS_2$-graphene; (i) Raman spectrum of porous $ACT/NiS_2$-graphene.

The density and distribution of Ni nanoparticles on ACT have a significant influence on the electrochemical performance of the ACT/$NiS_2$ composite. The concentration of chemical reactants plays an important role on the size and morphology of the final products. FIG. 2 shows the SEM images of the ACT/Ni composites obtained at the $Ni(NO_3)_2$ concentration of 0.01 M, 0.5 M, 1 M and 2 M, respectively. The density and size of Ni nanoparticles increased with increasing $Ni(NO_3)_2$ concentration, which was evident in the XRD pattern where the intensities of Ni diffraction peaks increased as the $Ni(NO_3)_2$ solution was more concentrated (FIG. 3). However, when the $Ni(NO_3)_2$ solution was diluted down to 0.01 M, no Ni particles were found (FIGS. 2a and 2b), which was further verified by XRD (FIG. 3). On the other hand, 2 M $Ni(NO_3)_2$ concentration produced large sized Ni particles (FIGS. 2g and 2h), which are not desirable. 1 M $Ni(NO_3)_2$ concentration led to the formation of pearl necklace-like Ni particles (FIGS. 2e and 2f). Much smaller and more homogeneously distributed Ni nanoparticles are formed on ACTs when the concentration was reduced down to 0.5 M (FIGS. 2c and 2d). More importantly, multilayered graphene sheets are formed spontaneously with Ni particles on the ACTs (FIGS. 4a and 4b), which was confirmed by Raman spectroscopy (FIG. 5). Raman spectroscopy is an important nondestructive technique to characterize graphitic materials, especially for the ordered/disordered crystal structures of graphene. Usually, graphene can be characterized by two main feature bands in a Raman spectrum: the G band arising from the first order scattering of the $E_{2g}$ phonon mode of in-plane $sp^2$ C atoms at about 1575 $cm^{-1}$ and the D band arising from a breathing mode of point photons of $A_{1g}$ symmetry at about 1350 $cm^-$. The increased $I_D/I_G$ ratio in the ACT/Ni composite (FIG. 5) resulted from the construction of graphene network during the annealing process. The higher $I_D/I_G$ ratio indicates the formation of smaller sized graphene with more defects and disordered structure. Compared with other ACT/Ni composites, ACT/Ni-graphene-0.5 (here -0.5 indicates that the ACT/Ni-graphene obtained at the $Ni(NO_3)_2$ concentration of 0.5 M) showed sharper D band and G band and relatively lower $I_D/I_G$, suggesting that larger and more ordered graphene formed on the ACT fibers. The graphene may facilitate electron transportation along the ACT surface, thus promoting current collection. ACT/Ni-graphene-0.5 composite was chosen herein as a representative to synthesize ACT/NiS$_2$-graphene composite and was further investigated in detail as an electrode for flexible lithium-ion batteries.

The close-up observation of ACT/Ni-graphene-0.5 is shown in FIGS. 4a-d. After annealing, Ni nanoparticles with a diameter of ~20 nm were closely anchored on the surface of corrugated and scrolled multilayered graphene sheets with a thickness of ~15.6 nm (about 50 mono-graphene layers). Those curled and entangled graphene sheets, wrapping along the ACT fibers, may serve as a conductive coat for fast electron transportation (FIGS. 4a and 4b). The cross-sectional SEM images of ACT/Ni-graphene-0.5 (FIG. 4c and inset of the amplified region) showed that the ACT fibers exhibited an intriguing tubular structure with a layered tube wall. The Ni nanoparticles not only decorated the outer surface of the ACT fibers but also embedded inside the tube walls (FIG. 4d). In addition, plenty of micro-channels were found in the walls of ACT fibers, which inherited from the cellulous structure of cotton (inset of FIG. 4d). Such tubular structure with micro-channels is expected to facilitate electrolyte ion diffusion and buffer volume change during the electrochemical reaction process. FIGS. 4e and 4f show the TEM images of ACT and ACT/Ni-graphene-0.5, revealing the porous structure of ACT fibers and Ni nanoparticles in the ACT. The AFM height and phase images (FIGS. 4g and 4h) show crumpled silk veil waves (from graphene) with Ni nanoparticles on the ACT fibers.

Figure 7:
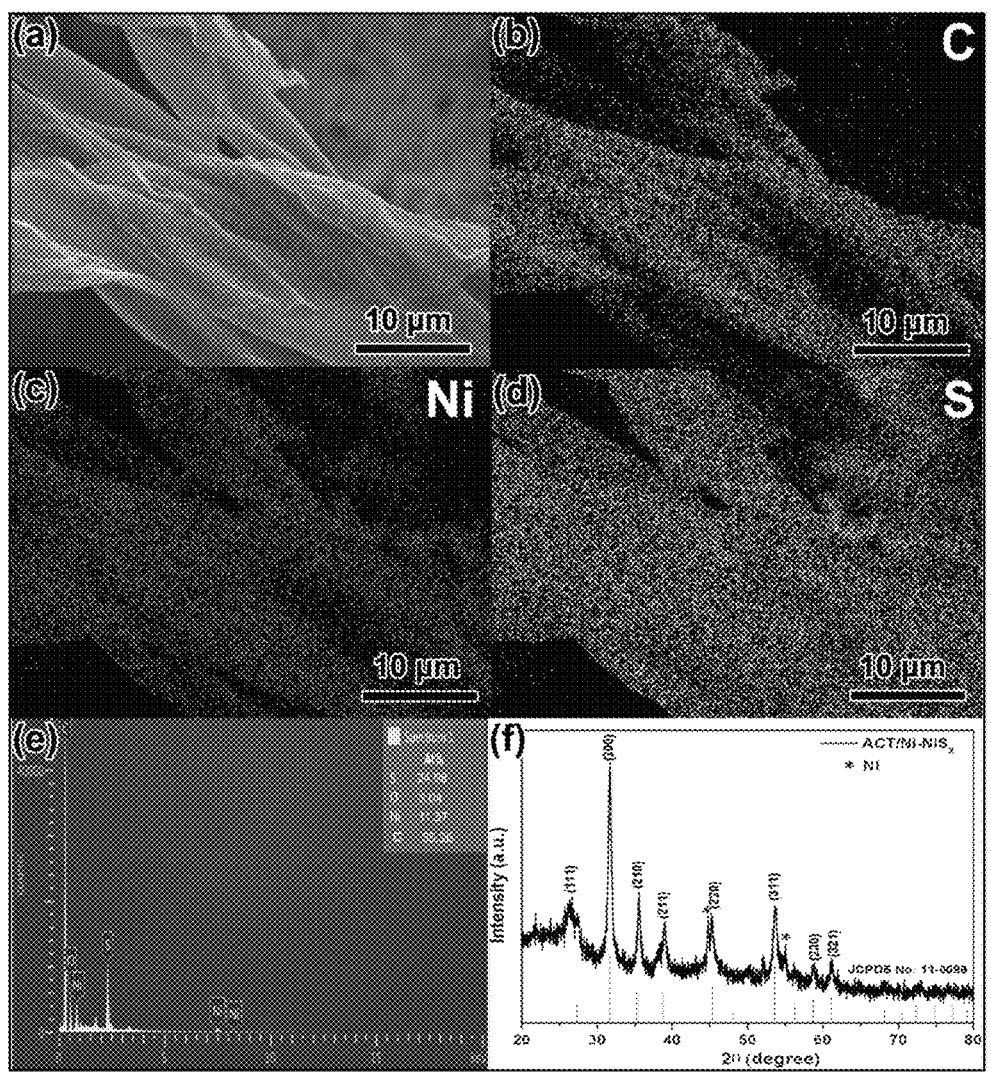
FIG. 7 shows (a)-(d) SEM image and the corresponding EDS maps of the obtained $ACT/NiS_2$-graphene-0.5 composite; (e) Relative element ratio of C, 0, S, Ni in the $ACT/NiS_2$-graphene composite; (f) XRD pattern of $ACT/NiS_2$-graphene composite.

FIGS. 6a and b show the representative SEM images of an ACT/NiS$_2$-graphene composite (transformed from the ACT/Ni-graphene-0.5). The NiS$_2$ nanobowls with an average size of ~200 nm were coated on and embedded inside the hollow ACT fibers. The bowl-like structure with interior and exterior arc surfaces may stand more contractile force induced by volume change during the insertion/deinsertion of Li$^+$ ions. The shell thickness of a typical NiS$_2$ nanobowl was about ~10 nm, as shown in the TEM images (FIGS. 6c and 6d), from which the surround porous carbon substrate can be clearly unveiled. The TEM and HRTEM images of the NiS$_2$ nanobowls (FIGS. 6d and 6e) reveal the lattice spacing of 0.283 nm in accordance with the (200) lattice plane of NiS$_2$. The selected area electron diffraction (SAED) pattern of the NiS$_2$ nanobowl shows spotty diffraction rings with a messy character (FIG. 6f), indicating that the NiS$_2$ bowl is a mixture of polycrystalline and amorphous phase, which is in good agreement with the XRD results (FIG. 7f). FIGS. 6g and 6h show the AFM images of ACT/NiS$_2$-graphene. The mesoscale porous structure of ACT/NiS$_2$-graphene composite may facilitate Li$^+$ ion diffusion and electron transport in the electrochemical reaction process, which in turn improve the overall energy density and rate performance of the cell. The chemical compositions of the ACT/NiS$_2$-graphene were further analyzed by energy-dispersive X-ray spectrometry (EDS) (FIG. 7). The Ni-S atomic ratio is about 11:25, which is close to the theoretical atomic ratio (1:2) of NiS$_2$, indicating that the Ni nanoparticles were transformed into the NiS$_2$ during the heat treatment process. The EDS C and S maps further revealed that the ACT fibers were uniformly covered by the NiS$_2$ nanoparticles. The Raman spectrum of ACT/NiS$_2$-graphene (FIG. 6i) exhibited a similar $I_D/I_G$ ratio compared with ACT/Ni (FIG. 4i), indicating that the multilayered graphene sheets on the ACT remained after the annealing process.

Figure 8:
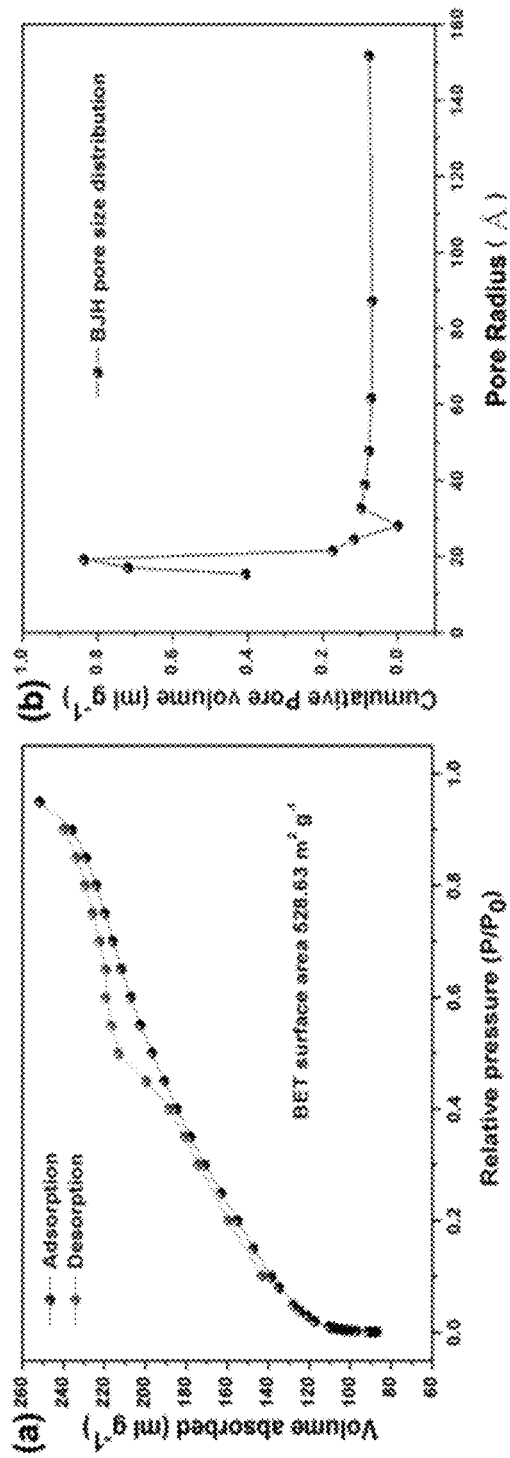
FIG. 8 shows (a) BET measurement-isothermal curve of $ACT/NiS_2$-graphene composite; (b) BJH pore size distribution of $ACT/NiS_2$-graphene composite.
Figure 9:
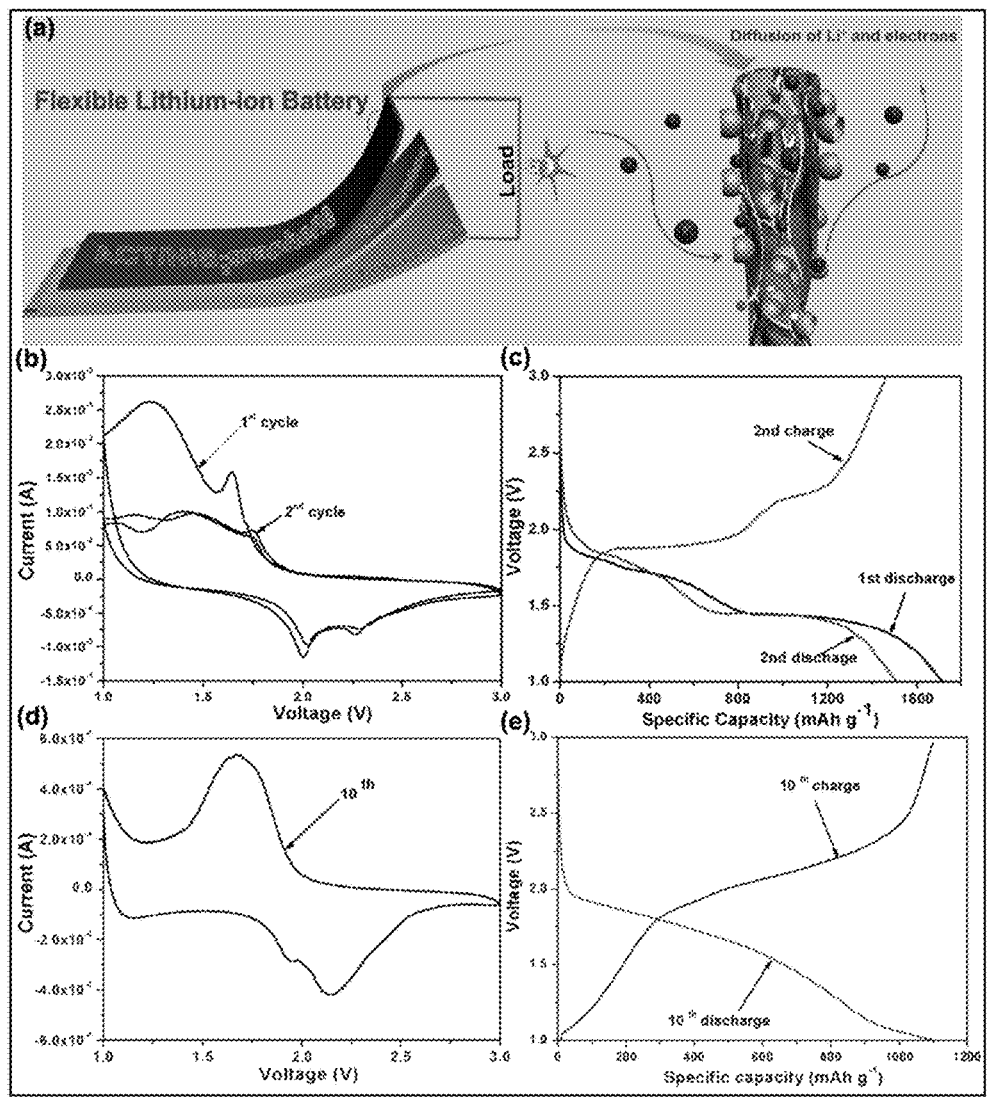
FIG. 9 shows electrochemical performance of the $ACT/NiS_2$-graphene composite electrode, (a) Schematically illustration of the assembled flexible lithium-ion battery; (b) Initial cyclic voltammogram profiles of $ACT/NiS_2$-graphene; (c) Initial charge/discharge voltage-specific capacity curves of porous $ACT/NiS_2$-graphene at 0.01 C; (d) Cyclic voltammogram profiles of $ACT/NiS_2$-graphene after 10 charge/discharge processes; (e) $10^{th}$ charge/discharge voltage-specific capacity curves of $ACT/NiS_2$-graphene at 0.01C.
Figure 10:
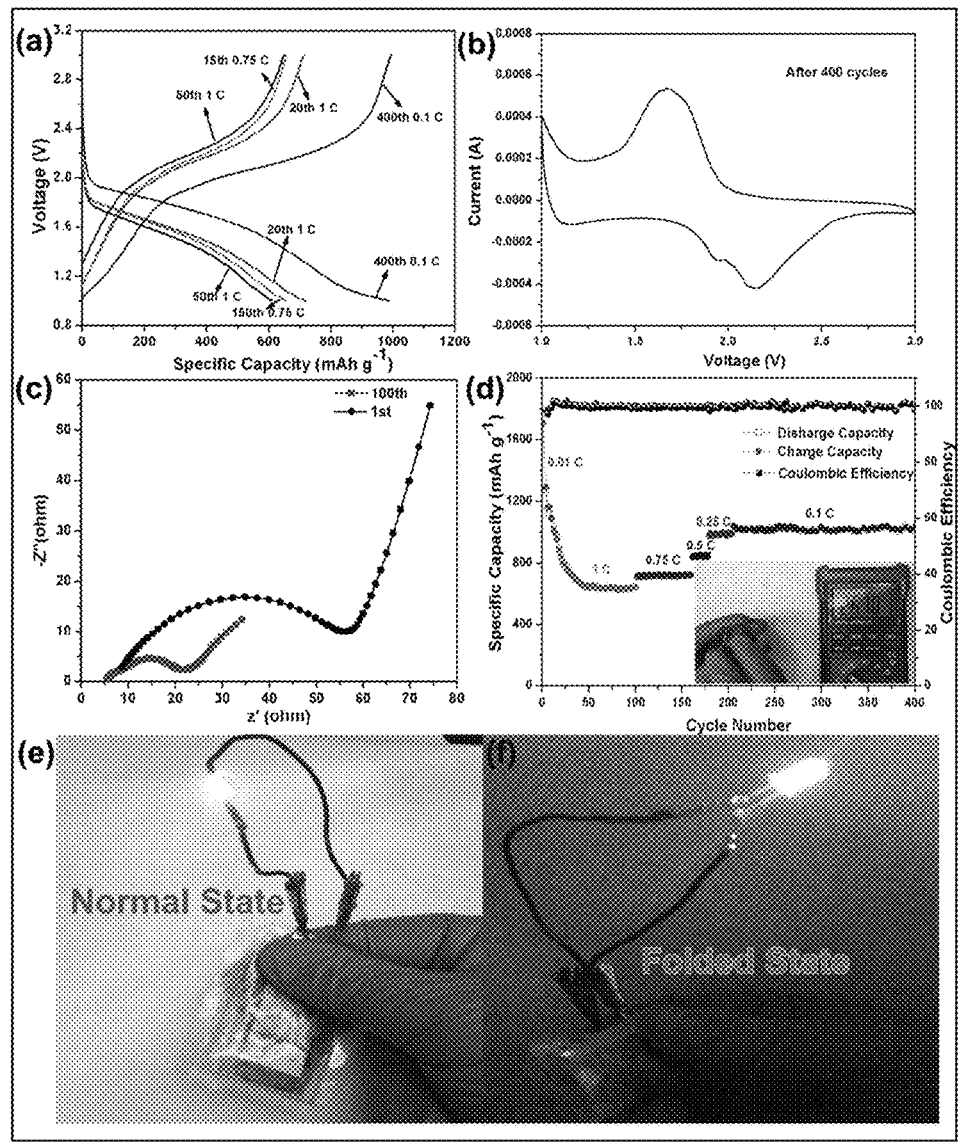
FIG. 10 shows electrochemical performance of the flexible cell assembled with flexible $ACT/NiS_2$-graphene electrode, (a) $20^{th}$, $50^{th}$, $150^{th}$ and $400^{th}$ charge/discharge voltage-specific capacity curves of $ACT/NiS_2$-graphene at different charge/discharge rates; (b) Cyclic voltammogram profiles of $ACT/NiS_2$-graphene after 400 charge/discharge processes; (e) Nyquist plots of $ACT/NiS_2$-graphene at the $1^{st}$ and $100^{th}$ charge/discharge processes; (f) Cycling and rate performance of porous $ACT/NiS_2$-graphene, inset is the open circuit potential of the assembled flexible battery cell under bent state; (e) and (f) Optical photograph of a yellow light-emitting diode (LED) lighted by the assembled flexible battery under normal and folded states, respectively.
Figure 11:
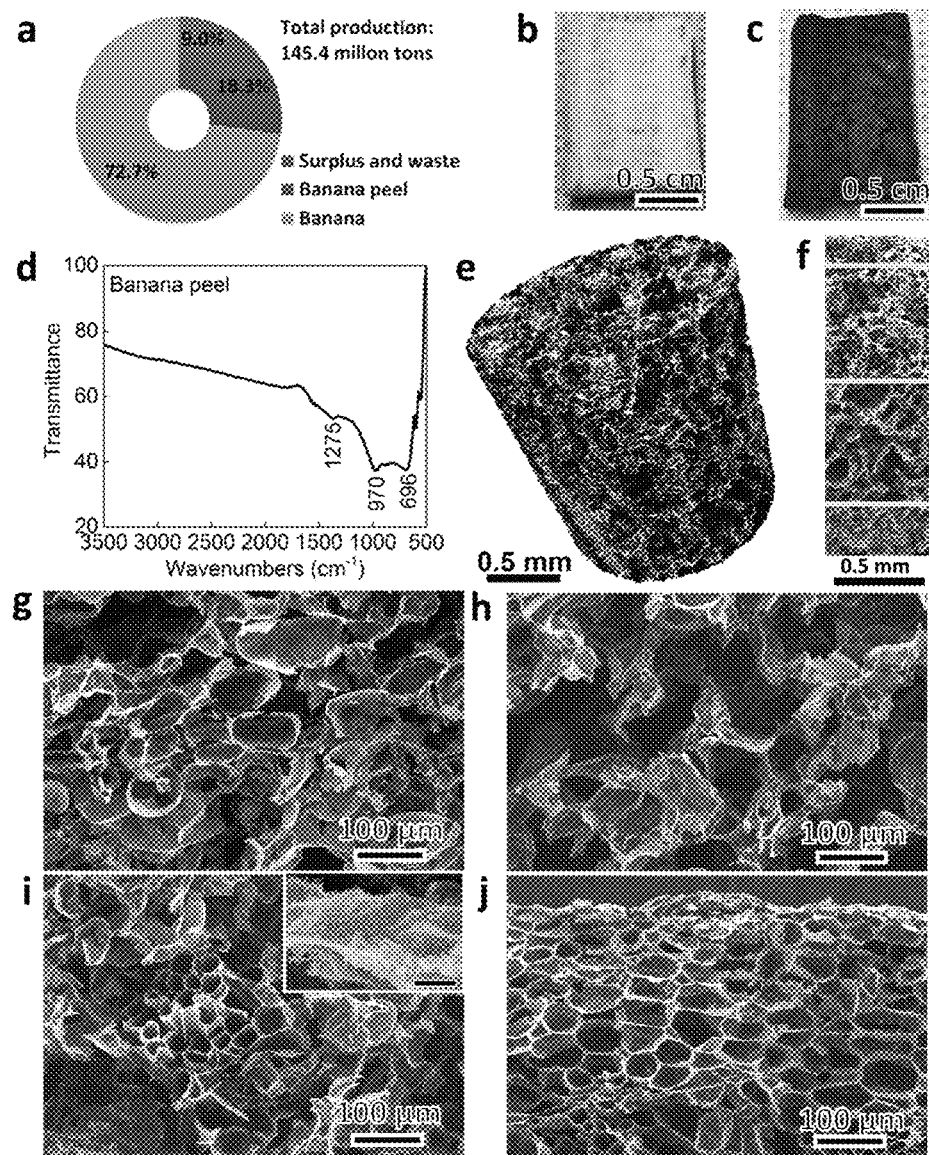
FIG. 11 shows activation and microstructure of ABP, (a) Banana production in 2011; (b) A piece of freeze dried banana peel; (c) A piece of ABP; (d) FTIR spectrum of ABP; (e) 3D XCT image of ABP (the diameter and height of the examined ABP cylinder are respectively 2 mm); (f) Cross-sectional SEM image of ABP, showing 4 different layers; (g) The bottom layer (close to banana), consisting of micropores with a size of about 30 μm; (h) The second layer, showing net-like, in compact structure; (i) The third layer, showing pores in the net-like matrix. The inset shows a mesoporous thin film (scale bar 2 μm); (j) The outmost layer with compact porous structure.

Lithium-ion electrode materials with high specific surface areas are expected to render a large number of active sites to participate in the Faradaic redox reaction and these active sites in turn serve as pre-reserved spaces for the volume expansion during the lithiation-delithiation process. A suitable pore size distribution is critical to shorten the electrolyte ion transport path and improve the rate performance in fast Faradaic redox reactions. The pore characteristics of ACT/NiS$_2$-graphene composite were investigated by the N$_2$-adsorption/desorption measurement, as shown in FIG. 8. The adsorption/desorption isotherm curve exhibited a typical type IV profile with a clear hysteresis loop, indicating the mesoporosity nature of the ACT/NiS$_2$-graphene composite. A large Brunauer-Emmet-Teller (BET) surface area of 528.63 m$^2$ g$^{-1}$ was revealed for the ACT/NiS$_2$-graphene composite, which is ascribed to the joint contributions from the porous ACT tubes, NiS$_2$ nanobowls and graphene sheets. The pores exhibit a relatively wide size distribution ranging from 2 to 32 nm, with the average pore radius of ~15 nm, which is desirable for lithium ion battery applications.

Electrochemical Performance of Flexible ACT/NS$_2$-Graphene Composite Electrodes Both coin and flexible cells were assembled with the ACT/NS$_2$-graphene composite as cathode, lithium foil as anode, and a piece of Celgard 2400 as separator, as schematically illustrated in FIG. 9a. The electrochemical performance of the as-assembled cells was investigated by cyclic voltammetry (CV) and galvanostatic charge/discharge tests and electrochemical impedance spectroscopy (EIS). FIG. 9b shows the 1$^{st}$ and 2$^{nd}$ CV curves of the ACT/NS$_2$-graphene composite at a constant scan rate of 0.5 mV s$^{-1}$ from 3 to 1 V. Two reduction peaks appear at about 1.2 V and 1.6 V in the first cycle, which was ascribed to the insertion of the Li$^+$ ions into the composite. However, in the following cycles, the reduction peak at 1.2 V disappeared, replaced by a new reduction peak at around 1.5 V. This suggests that the solid electrolyte interphase (SEI) layers formed mainly in the first cycle.

Without being held to a particular theory, we believe that the broad reduction peak at 1.2 V in the first cycling was ascribed to the insertion of Li$^+$ ions into NiS$_2$, forming LiNiS$_2$. The electrochemical reaction processes in the first cycle can be expressed using the following equations:[60]

$$NiS_2 + xLi^+ + xe^- \rightarrow Li_xNiS_2 (x=3-4) \quad (5)$$

$$Li_xNiS_2 + 4Li^+ + 4e^- \rightarrow Ni/Li_x + 2Li_2S \quad (6)$$

In contrast, the two oxidation peaks, which appeared at 1.96 and 2.3 V in the first cycle resulting from the extraction of Li$^+$ ions, did not change much in subsequent cycles. The anodic peak at 2.3 V corresponds to the oxidation of Li$_2$S into sulfur. Thus, after the first cycle, the electrode could be regarded as a mixture of S and Ni instead of the pristine NiS$_2$ compound. This was validated by the constant current discharge/charge profile (FIG. 9c) in which the discharge and charge potential plateaus match well with the CV curve in the corresponding electrochemical process.

The typical discharge capacities for the 1$^{st}$ and 2$^{nd}$ cycles at the current density of 0.01 C were about 1710 and 1515 mAh g$^{-1}$, respectively. The large irreversible capacities could be ascribed to the irreversible reactions during the cyclic process, such as the trapping of lithium inside the active materials, the formation of SEI films, and the electrolyte decomposition. Without being held to a particular theory, the ultrahigh initial discharge capacity may probably result from the residual sulfur in ACT fibers. After 10 charge/discharge cycles, the reduction peak shifted from 1.5 V to 1.6 V. At the same time, the oxidation peak at 1.96 V becomes smaller and shifted to 1.9 V, and the oxidation peak at 2.3 V shifted to 2.2 V (FIG. 9d), corresponding respectively to the formation of NiS$_2$ and the decomposition of Li$_2$S (Ni/Li$_x$ + 2Li$_2$S $\rightarrow$ Li$_x$NiS$_2$ + 4Li$^+$ + 4e$^-$). The CV results agree well with the potential plateaus in the charge/discharge profiles (FIG. 9e). After 10 charge/discharge cycles, the capacity reduced down to 1100 mAh g$^{-1}$, which may be caused by the dissolution of polysulfide in the electrolyte.

Rate capability is an important factor for evaluating the performance of a battery. The current densities were varied from 0.01 C to 1 C to investigate the rate performance of the ACT/NiS$_2$-graphene composite electrode. FIG. 10a shows the representative charge/discharge profiles. With increasing charge/discharge rate, the charge potential plateau increased whereas the discharge potential plateau decreased, which might be ascribed to the kinetic effects of the electrode material, leading to higher over potential and lower capacity at the high rate regime. The reversible capacities at the 20$^{th}$ (1 C), 50$^{th}$ (1 C), 150$^{th}$ (0.75 C) and 400$^{th}$ (0.1 C) cycles are ~710, ~608, ~680, and ~1030 mAh g$^{-1}$, respectively. It can be seen that the capacity retained at ~608 mAh g$^{-1}$ even when the charge/discharge rate increased 100 times from 0.01 C to 1 C. More importantly, after 400 cycles the capacity of ~1030 mAh g$^{-1}$ was reversibly restored when the charge/discharge rate was reduced down to 0.1 C. In particular, compared with the CV curve of the 10$^{th}$ cycle (FIG. 9d), the redox peaks of the CV curves after 400 cycles (FIG. 10b) kept almost unchanged, demonstrating robust reversibility of the ACT/NiS$_2$-graphene hybrid electrode.

Electrochemical impedance spectroscopy (EIS) measurements of the ACT/NiS$_2$-graphene electrode were carried out before and after 100 cycling times. As shown in FIG. 10c, both profiles exhibit a semicircle in the high frequency regime and a straight line in the low frequency region, indicating that the electrochemical process was controlled by charge transfer and lithium ion transport. The semicircle arc at the high frequency range can be assigned to the charge transfer resistance ($R_{ct}$), and the straight line at the low frequency regime corresponds to the lithium ion diffusion. The charge-transfer resistance was measured from the diameter of the semicircle arc. Clearly, the ACT/NiS$_2$-graphene electrode displayed a larger $R_{ct}$ (50Ω) before cycling than that of the cell after 100 cycles (10Ω) because of the inactivation of electrode before cycling, which was also used to measure the resistance of SEI layer on the electrode surface. The small semicircle for the ACT/NiS$_2$-graphene electrode after 100 cycles indicates its good conductivity and fast electrolyte ion diffusion, which can be ascribed to the multiscale porous hierarchical structure of active materials—NiS$_2$ nanobowls, graphene and hollow ACT fibers, good adhesion and excellent electrical contact between the active material and conductive substrate.

Cycling life and coulombic efficiency are two important parameters for evaluating the practical applications of a battery. The cyclic performance and corresponding coulombic efficiency of the ACT/NiS$_2$-graphene cell were characterized by the charge/discharge tests at different charge/discharge rates for up to 400 cycles, as shown in FIG. 10d. It can be seen that the capacity decreased sharply for the first 10 cycles at 0.01 C. Without being held to a particular theory, we believe that the fast capacity decay at the initial stage may be ascribed to the formation of the SEI film, decomposition of electrolyte, and the further lithium insertion at the Ni/LiS$_2$ interface. For the following-up cycles at 1 C, the capacity decreased gradually and then maintained at about 610 mAh g$^{-1}$ after 50 cycles, which could be caused by the fast kinetic effect at the high charge/discharge rate regime, the dissolution of the polysulfide intermediates and the volume expansion during the electrochemical reaction. However, after 50 cycles, the structure and the composition of the electrode became more stable, leading to an excellent reversible capacity. Furthermore, the ACT/NiS$_2$-graphene hybrid material showed better cyclic performance at stepwise charge/discharge rates, with a recovery of capacity of ~1032 mAh g$^{-1}$ at 0.1 C even after 400 cycles. Most importantly, except for the initial several cycles, the coulombic efficiency of the ACT/NiS$_2$-graphene electrode maintained almost 100% upon cycling (FIG. 10d). To further demonstrate the practical applications of the as-prepared ACT/NiS$_2$ composite for flexible energy storage devices, the flexible cell was used to light a commercial LED (FIG. 10e). The open circuit potential maintained at 2.67 V even in a bent state (inset of FIG. 10d). The brightness of the lightened LED did not change even at severely folded state (FIG. 10f), indicating its excellent flexibility and robustness.

The activated cotton textiles (ACTs) converted from a cotton T-shirt may be an excellent wearable platform for fabricating flexible supercapacitors due to their magnificent flexibility, lightweight, and conductivity. Herein we converted cotton textiles into ACTs by annealing a Ni(NO$_3$)$_2$ solution treated cotton T-shirt. Such ACTs were porous tubular fibers embedded with Ni nanoparticles and wrapped with graphene sheets which are formed spontaneously during the activation process. After thermally treating the ACT/Ni-graphene with sulfur, the Ni nanoparticles in ACT fibers are transformed into NiS$_2$ nanobowls with ultra-large surface area whereas the ACT fibers and graphene remained as they were. Such nanobowl architectures alleviate structure collapse, maintaining the structure stability during the charge/discharge process. When used as a binder-free anode, the ACT/NiS$_2$-graphene electrode delivered an exceptionally high initial discharge capacity (~1710 mAh g$^{-1}$ at 0.01 C), impressive rate performance (the discharge capacitance retained at 645.3 mAh g$^{-1}$ at 1 C after 100 cycles) and outstanding cyclic stability (the discharge capacitance recovered up to 1016 mAh g$^{-1}$ at 0.1 C after 400 cycles). A thin, lightweight, and flexible lithium-ion battery was assembled to demonstrate its practical usage as a flexible power source. This flexible battery retained its high capacity and excellent cyclic stability without structural failure at folded state, opening up unprecedented opportunities for constructing high performance flexible lithium-ion batteries.

Banana-Peel Derived High-Capacity Supercapacitors and Batteries

Activation of Banana Peels

Figure 12:
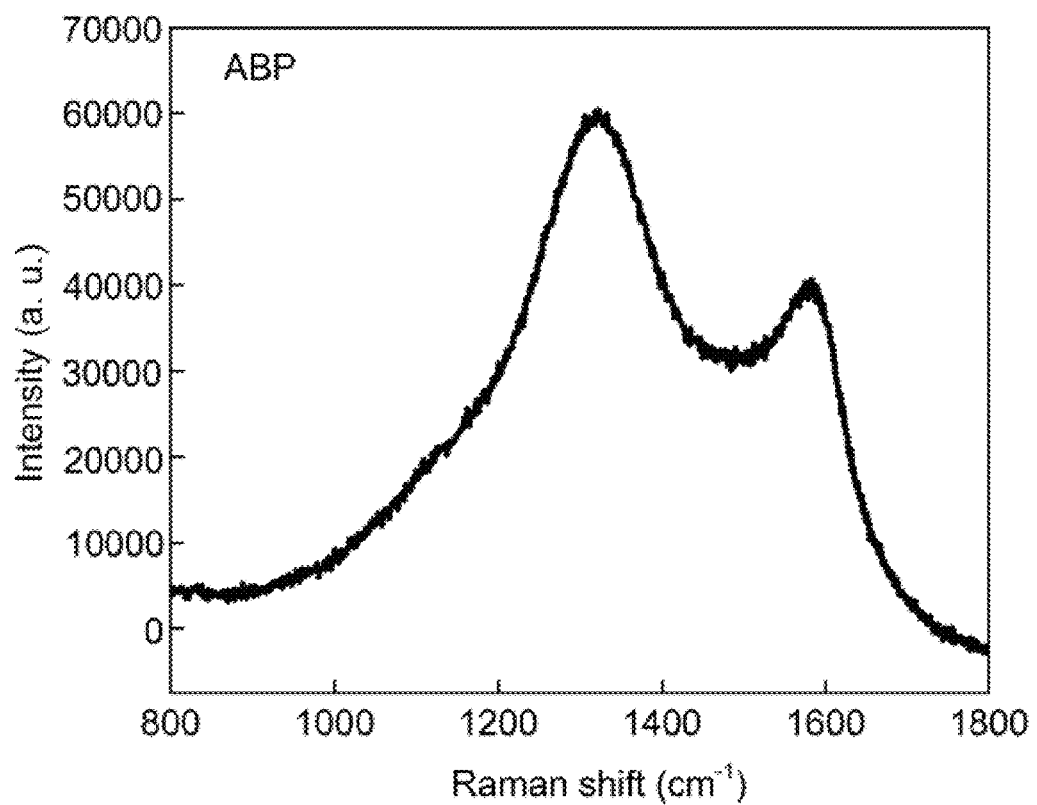
FIG. 12 shows raman spectrum of ABP.

Considering the mass production of bananas and waste banana peels (FIG. 11a), recycling surplus and abandoned banana peels is economically and socially significant. In our experiments, banana peels from a supermarket were cut into pieces and frozen in a freezer without further treatment. The frozen pieces were then lyophilized in a freeze dryer for 3 hour. After the freeze-drying process, the banana peel pieces preserved their original cell architectures but were dehydrated (FIG. 11b). The subsequent heating process at 900° C. for 1 hour with continuous argon gas flow converted the banana peel pieces into activated carbon with dark black color (FIG. 11c). The electrical resistance of the activated banana peel (ABP) was measured (by multimeter) to be 17.7Ω. Statistically, the sheet resistance of ABP ranges from 7.5-16.5 Ωsq$^{-1}$. The density of ABP ranges from 0.08 g cm$^{-3}$ to 0.13 g cm$^{-3}$, depending on the raw materials. The ABP from mature bananas often exhibits slightly higher densities, which may be ascribed to a higher concentration of sugar and more extensive dehydration. There were no obvious peaks beyond 1500 cm$^{-1}$ in the Fourier transform infrared spectroscopy (FTIR) spectrum of ABP (FIG. 1d). Several peaks located in between 600 to 900 cm$^{-1}$ were attributed to C—H bonds in aromatic compounds, which came from aromatization during heating. Another small peak at 1275 cm$^{-1}$ in the spectrum can be assigned to the C—O bonds in ester, ether, or phenol. ABP's Raman spectrum exhibited a broad G bond at 1580 cm$^{-1}$ and D bond at 1350 cm$^{-1}$ (FIG. 12). Different from the sharp G bonds and low $I_D/I_G$ values of graphite and graphene, the obvious broad D bonds and high $I_D/I_G$ values of ABP pointed towards the amorphous carbon with relative low graphitization.

Microstructure of ABP

Figure 13:
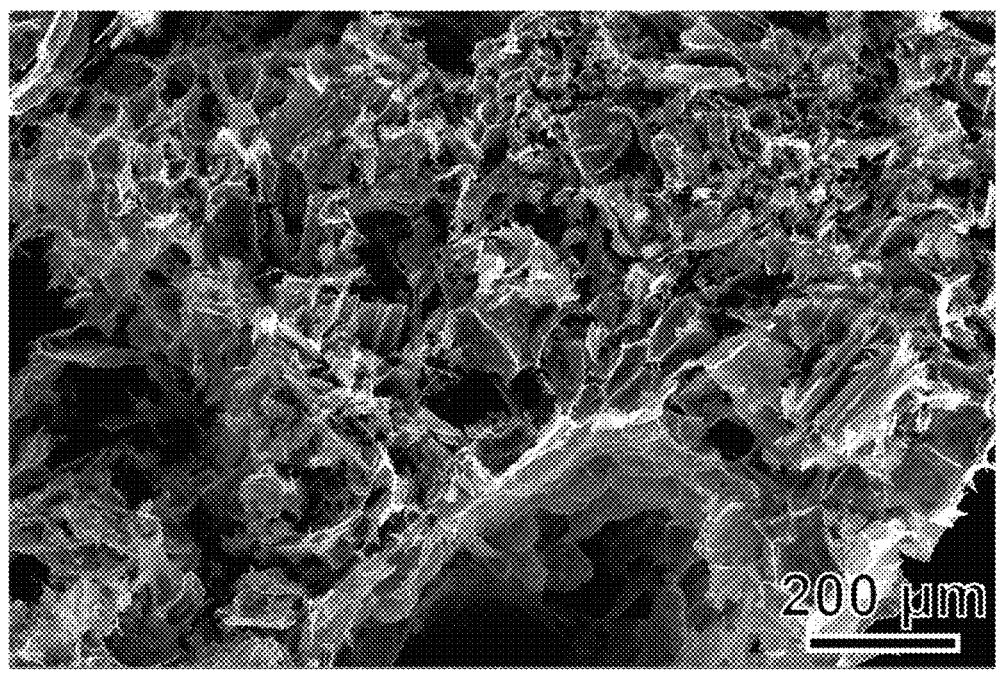
FIG. 13 shows SEM image of ABP without freeze dry.

The reconstructed three dimensional X-ray computed tomography (XCT) image (FIG. 11e) and low magnification scanning electron microscope (SEM) image (FIG. 11f) of ABP exhibit an incompact and multi-layered architecture with 4 different layers from the inside out. The inner layer (closest to the banana) possesses numerous micropores with the size of approximately 30 μm (FIG. 11g). The second layer moving outward shows a loose and net-like structure (FIG. 11h). The third layer out shows a combination of fiber bundles with a net-like matrix (FIG. 11i). The outermost layer consists of smaller compact pores with a size of about 20 μm, originating from the outer epidermal cells of the peel (FIG. 11j). The porous structure of this ABP results in a large Brunauer-Emmet-Teller (BET) surface area of 194 m$^2$ g$^{-1}$ and low density (0.094 g cm$^{-3}$). The BET surface area of ABP is also higher than the untreated banana peel fibers. Without being held to a particular theory, we believe this can be attributed to the joint effects of the micropores in the first and forth layers of ABP, the foam structure in the second and third layers, and the net-like thin nanoporous films in the matrix (see the inset in FIG. 11i). Worth mentioning is the important role the freeze-drying process plays: without freeze-drying, ABP architectures would collapse during activation, leading to a structure without definite shape (FIG. 13).

Supercapacitors from ABP

Figure 14:
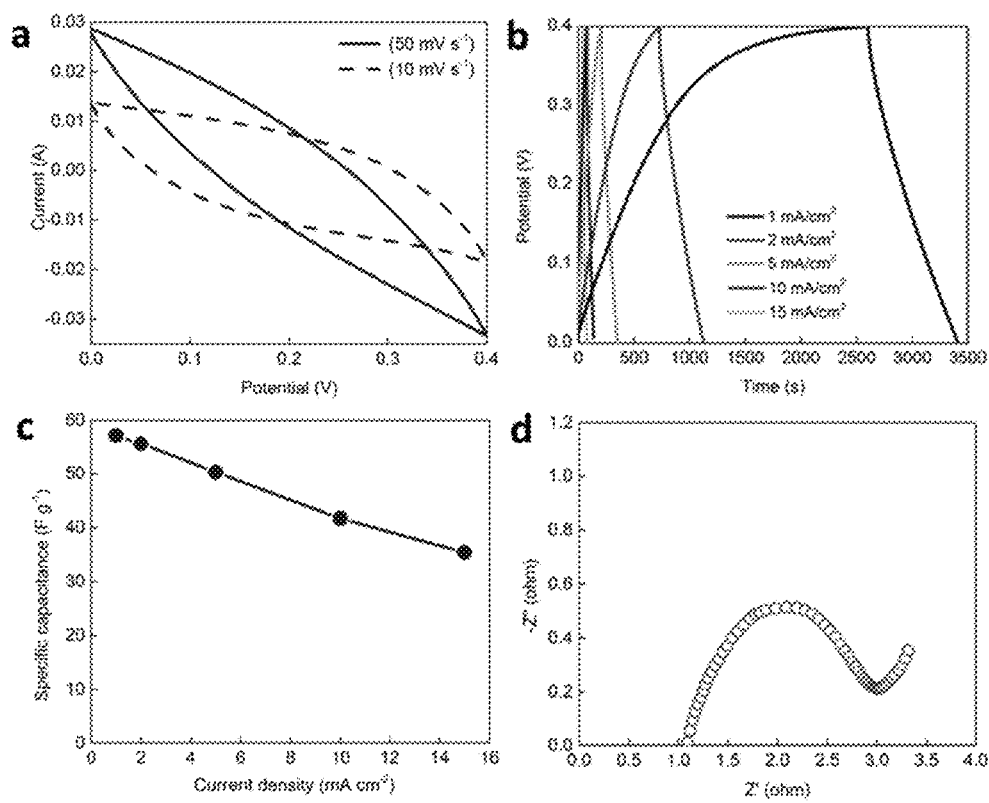
FIG. 14 shows electrochemical performance of ABP in the three-electrode system, (a) CV curves of ABP; (b) GV charge/discharge curves of ABP; (c) Specific capacitance of ABP electrode at various current densities; (d) EIS curve of ABP.
Figure 15:
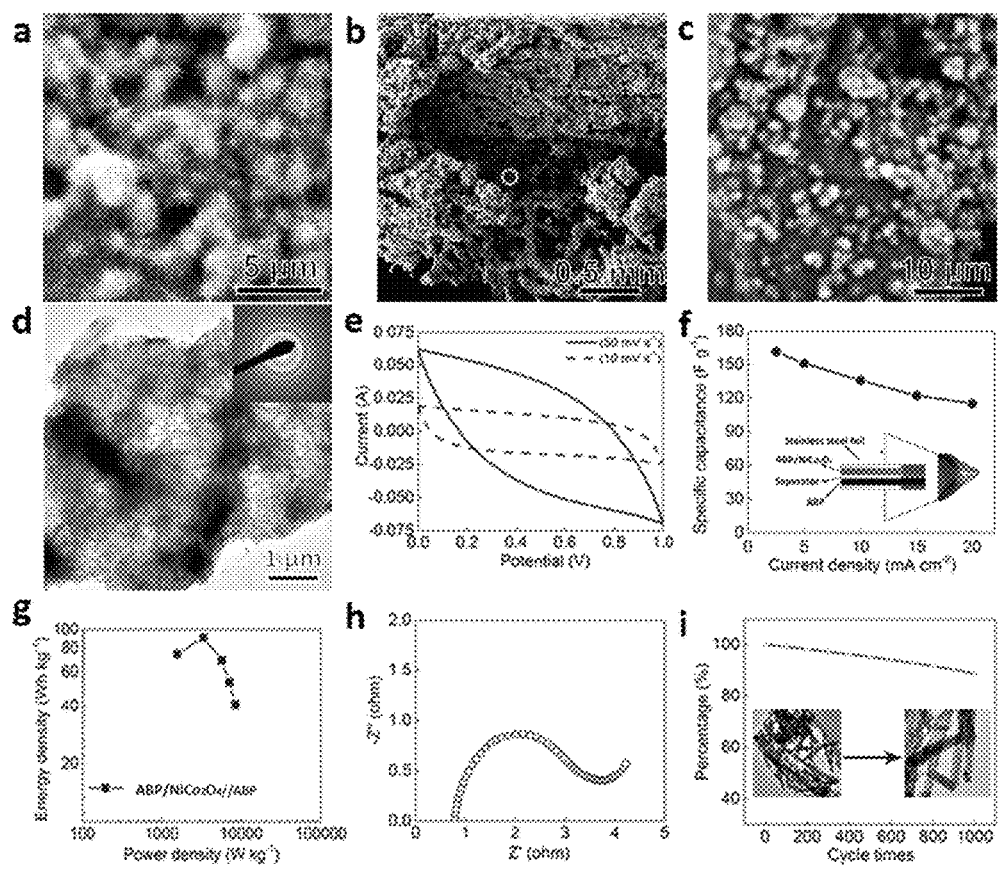
FIG. 15 shows microstructure of $ABP/NiCo_2O_4$ composite and electrochemical properties of an ABP based asymmetric supercapacitor, (a) SEM image of $NiCo_2O_4$ microparticles on the surface of ABP; (b) Side view of the $ABP/NiCo_2O_4$ composite; (c) A close-up observation of the impaled hole, showing that $NiCo_2O_4$ also grew inside the ABP pores (yellow cycled area in (b)); (d) TEM image of urchin-like $NiCo_2O_4$ microparticles, showing $NiCo_2O_4$ nanowires (inset: SAED pattern of the urchin-like $NiCo_2O_4$ particle); (e) CV curves of an $ABP/NiCo_2O_4//ABP$ asymmetric supercapacitor at different scan rates; (f) Specific capacitance of the asymmetric supercapacitor at different scan rates. Inset is a sketch of the assembled asymmetric supercapacitor; (g) Ragone plots of the as-assembled asymmetric supercapacitor; (h) EIS of the asymmetric supercapacitor; (i) Cyclic performance of the asymmetric supercapacitor. Inset shows the microstructure of spinal $NiCo_2O_4$ before and after the cycling test (the size of inset TEM images is 280×280 nm)).
Figure 16:
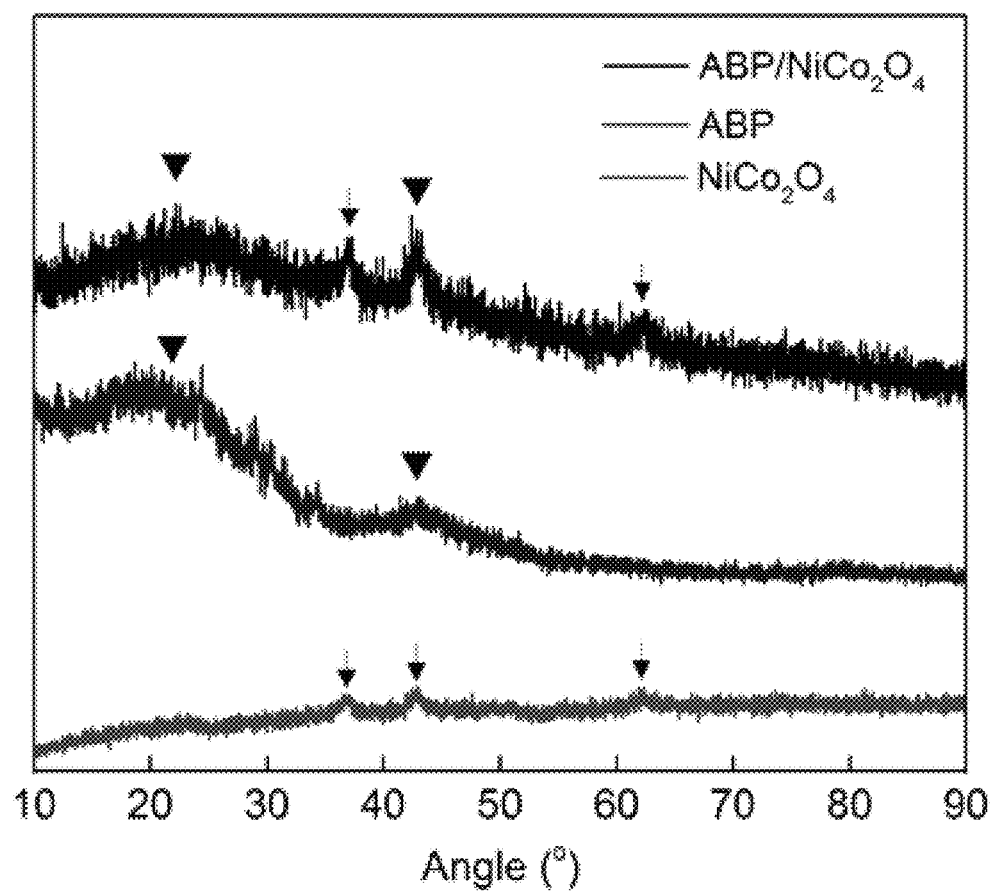
FIG. 16 shows XRD spectra of $NiCo_2O_4$ treated ABP.

ABP was directly used as an electrode in a three-electrode system for supercapacitor application and exhibited outstanding double-layer capacitance (FIG. 14). The multi-layered, hierarchically porous architecture makes ABP an ideal supporting backbone to composite with other active materials. A mild hydrothermal process was used to grow $NiCo_2O_4$ nanowires in-situ on the ABP. FIG. 15a shows a representative SEM image of the ABP/$NiCo_2O_4$ hybrid in which urchin-like $NiCo_2O_4$ microparticles (comprised of spinal $NiCo_2O_4$ nanowires) were uniformly coated on the surface of ABP, which is expected to facilitate ion diffusion and electron transfer. Moreover, not only the surface but also the inside pores of ABP were covered by $NiCo_2O_4$ nanowires, which can be attributed to the ABP's 3D net-like architecture that promoted the infiltration of reactants into the inner cavities of ABP during the hydrothermal reaction (FIG. 15b,c). FIG. 15d shows the transmission electron microscopy (TEM) image and corresponding selected area electron diffraction (SAED) pattern of $NiCo_2O_4$ microparticles, demonstrating that the urchin-like $NiCo_2O_4$ microparticles are actually comprised of $NiCo_2O_4$ nanowires. The spotty diffraction rings with messy character suggest that polycrystalline and amorphous phases coexist in the $NiCo_2O_4$ nanowires, which is in good agreement with the poor crystallinity observed in the XRD (FIG. 16). Close-up observation (FIG. 17) unveiled that the $NiCo_2O_4$ nanowires have a length of about 500 nm and diameter of about 20 nm; individual $NiCo_2O_4$ nanowires are comprised of small grains with 2-4 nm nanopores, not only increasing the surface areas but also enhancing the pseudo-capacitance of the electrode. The electrochemical performance of $NiCo_2O_4$/ABP electrodes in the three-electrode system was significantly enhanced, as demonstrated by the increased current response in the cyclic voltammetry (CV) curves and the prolonged discharge period in the galvanostatic (GV) charge/discharge curves (FIGS. 18a and 18b). Overall, the $NiCo_2O_4$/ABP hybrid electrode showed three times higher specific capacitance than the ABP electrode (FIG. 14). The ABP/$NiCo_2O_4$ hybrid electrode exhibited high specific capacitances of 218.6, 188.1, 166.3, 143.2, and 132.8 F/g at the current densities of 1, 2, 5, 10, and 15 mA cm$^{-2}$, respectively (FIG. 18c). In fact, the specific capacitances of $NiCo_2O_4$ in the ABP hybrid electrode reached 1670.3 F g$^{-1}$ (based on the mass of $NiCo_2O_4$ alone) (FIG. 18d). It is noteworthy that the ABP based supercapacitor in the three-electrode system displayed acceptable charge transfer resistance (Rct) (FIG. 14d). Compared with the ABP electrode (FIG. 14d), $R_{ct}$ value of the hybrid electrode is smaller, which could be attributed to that the hierarchical microstructure of the urchin-like $NiCo_2O_4$ further shortened the ion diffusion path (FIG. 18e).

Figure 17:
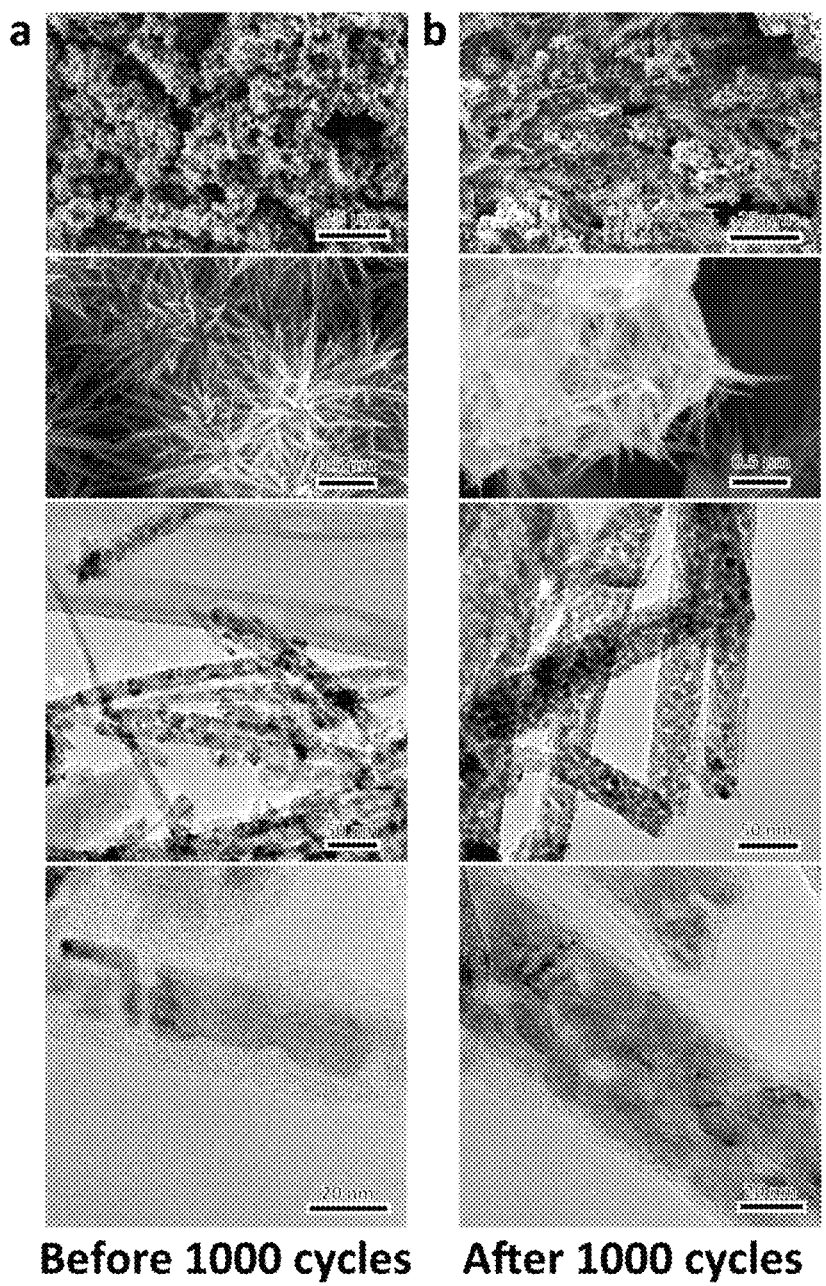
FIG. 17 shows SEM and TEM images of the $ABP/NiCo_2O_4$ electrode before and after 1000 cycles, (a) Before cycling test; (b) After 1000 cycles.
Figure 18:
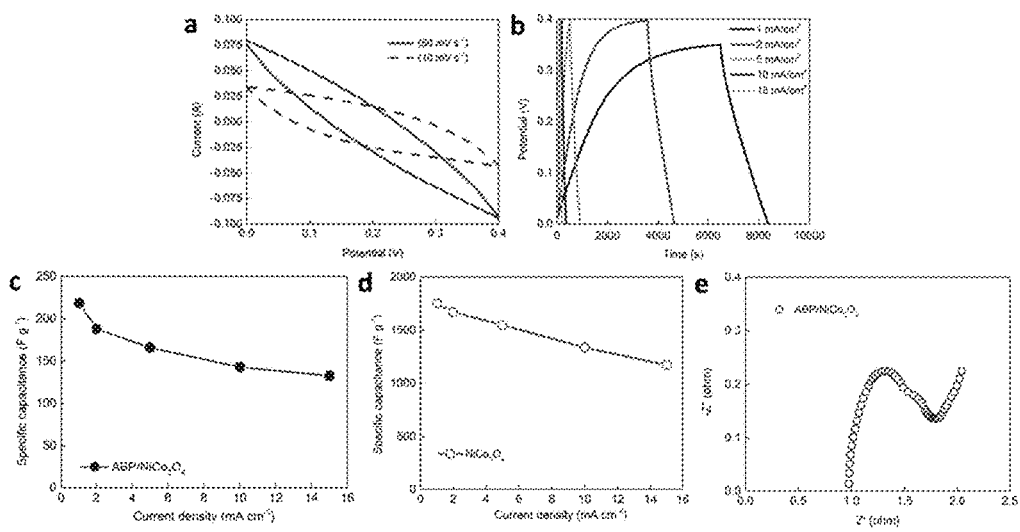
FIG. 18 shows electrochemical performance of $ABP/NiCo_2O_4$ electrode in the three-electrode system, (a) CV curves of ABP/NiCo₂O₄ electrode; (b) GV curves of ABP/NiCo₂O₄ electrode; (c) Specific capacitance of ABP/NiCo₂O₄ electrode at various current densities; (d) Specific capacitance of NiCo₂O₄ at various current densities; e, EIS curve of ABP/NiCo₂O₄.

Asymmetric supercapacitors were assembled to examine the practical utilization of the banana-based supercapacitors. ABP was used as the negative electrode and the ABP/$NiCo_2O_4$ composite as the positive electrode, while PVA/KOH gel served as both the solid electrolyte and separator (see the inset in FIG. 15f). No distortion was found in the CV curves of the ABP asymmetric supercapacitor at the low scan rate regime, indicating the excellent synergistic effects between the double-layer capacitive ABP and battery-type pseudo-capacitive $NiCo_2O_4$ (FIG. 15e). The specific capacitances of the ABP based asymmetric supercapacitor were measured to be 161.1 F g$^{-1}$ at 2.5 mA cm$^{-2}$ and 115.1 F g$^{-1}$ at 20 mA cm$^{-2}$ with a capacitance retention rate of 71.44% (even with an 8 fold increase in current density), indicating excellent rate performance (FIG. 15f). Energy density and power density are usually gained at the expense of another; however, a high performing supercapacitor is expected to provide high energy density at the high charge/discharge rate regime (power density). The energy density and power density of the ABP asymmetric supercapacitors are plotted in FIG. 15g. The ABP based asymmetric supercapacitor showed eminent performance with a high retained energy density of 40.7 Wh kg$^{-1}$ at a high power density of 8.4 kW kg$^{-1}$. FIG. 15h shows the electrochemical impedance spectroscopy (EIS) plots of the asymmetric supercapacitor, which exhibited similar tendency as it was in the three-electrode system. The slightly large $R_{ct}$ of ABP asymmetric supercapacitor is ascribed to the higher loading of $NiCo_2O_4$ and less compact ABP structure. FIG. 15i shows the cyclic performance of the assembled asymmetric supercapacitor, which was carried out by GV cyclic tests for over 1000 cycles at a current density of 15 mA cm$^{-2}$. Results showed that the ABP-based asymmetric supercapacitor had a capacitance retention rate of 88.7% after 1000 cycles. Without being held to a particular theory, we believe the decay of specific capacitance can be ascribed to the following two factors: the exfoliation of ABP and the segregation and aggregation of $NiCo_2O_4$ particles during cycling (FIG. 17). In fact, needle-like $NiCo_2O_4$ particles grew nearly two times in size after 1000 cycles, as shown by comparing the TEM images of pristine $NiCo_2O_4$ nanowires and the nanowires after 1000 cycles (see the insets in FIG. 15i and FIG. 17), leading to a reduction in surface areas for active materials. Compared with other pseudo supercapacitors on various substrates, the banana peel based supercapacitors exhibited superior capacity and energy density, competitive power density and cycle ability.

Li—S Batteries from ABP

Figure 19:
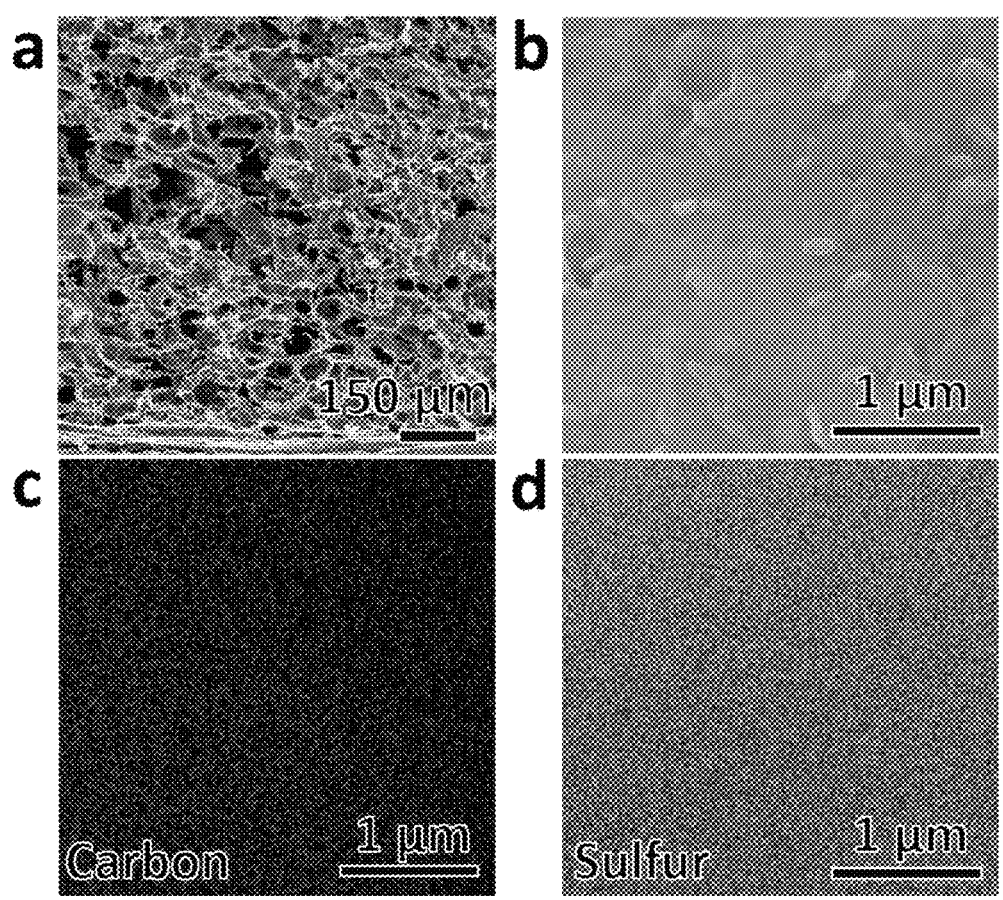
FIG. 19 shows SEM images and element maps of ABP/S composite, (a) SEM image of ABP; (b) SEM image of ABP/S; (c) Element map of carbon; d, Element map of sulfur.
Figure 20:
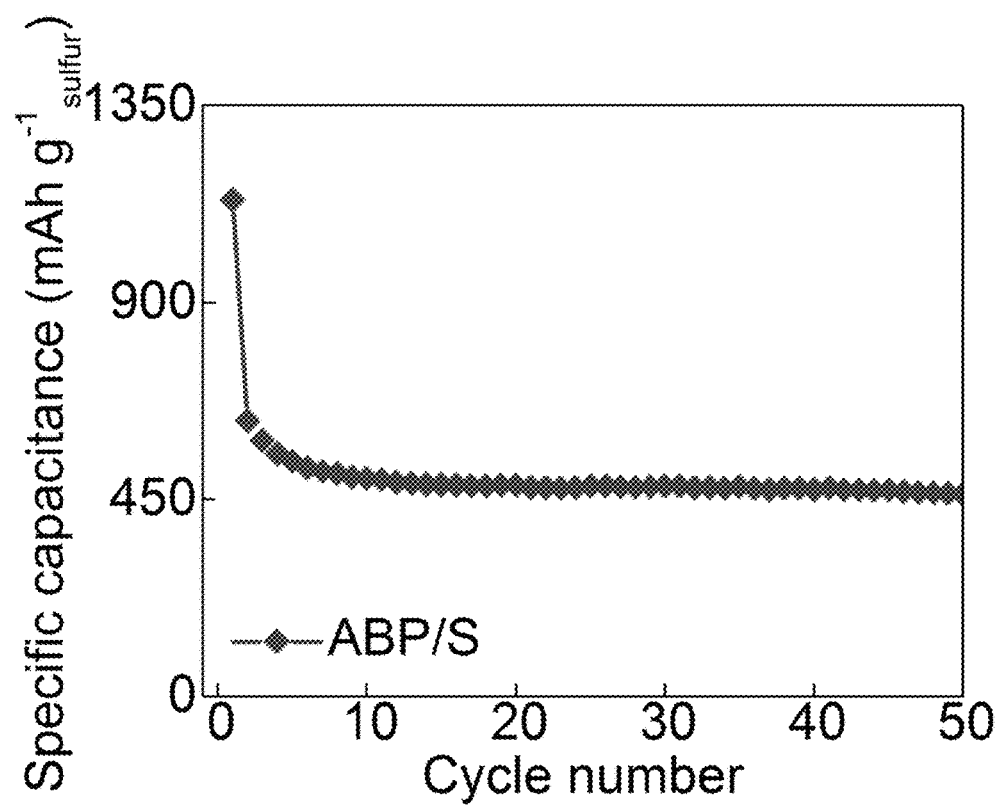
FIG. 20 shows cycle ability of Li-ABP/S battery.
Figure 21:
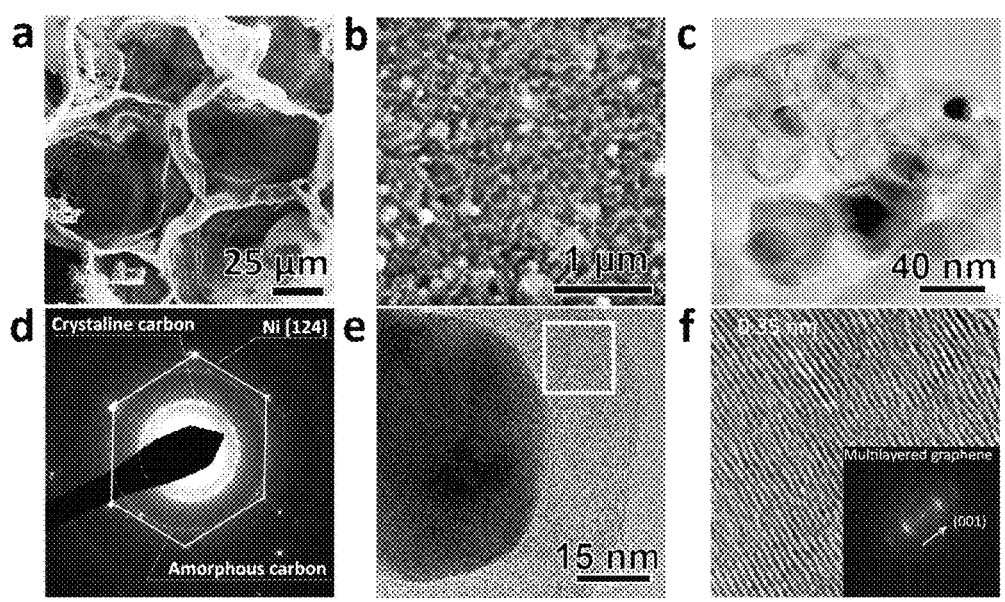
FIG. 21 shows microstructure of ABP/Ni/graphene composite, (a) SEM image of the Ni(NO₃)₂ treated ABP, showing the cellular porous structure; (b) Close-up view of the Ni(NO₃)₂ treated ABP, showing co-existence of nanopores and Ni nanoparticles on the cell walls; (c) TEM image of the Ni(NO₃)₂ treated ABP, showing the Ni nanoparticles wrapped with multilayered graphene; (d) SAED patterns of the Ni(NO₃)₂ treated ABP, indicating the co-existence of crystalline carbon, amorphous carbon, and crystalline Ni; (e) HRTEM image of a Ni nanoparticles wrapped with multi-layered graphene; (f) HRTEM image and FFT pattern of the multilayered graphene.
Figure 22:
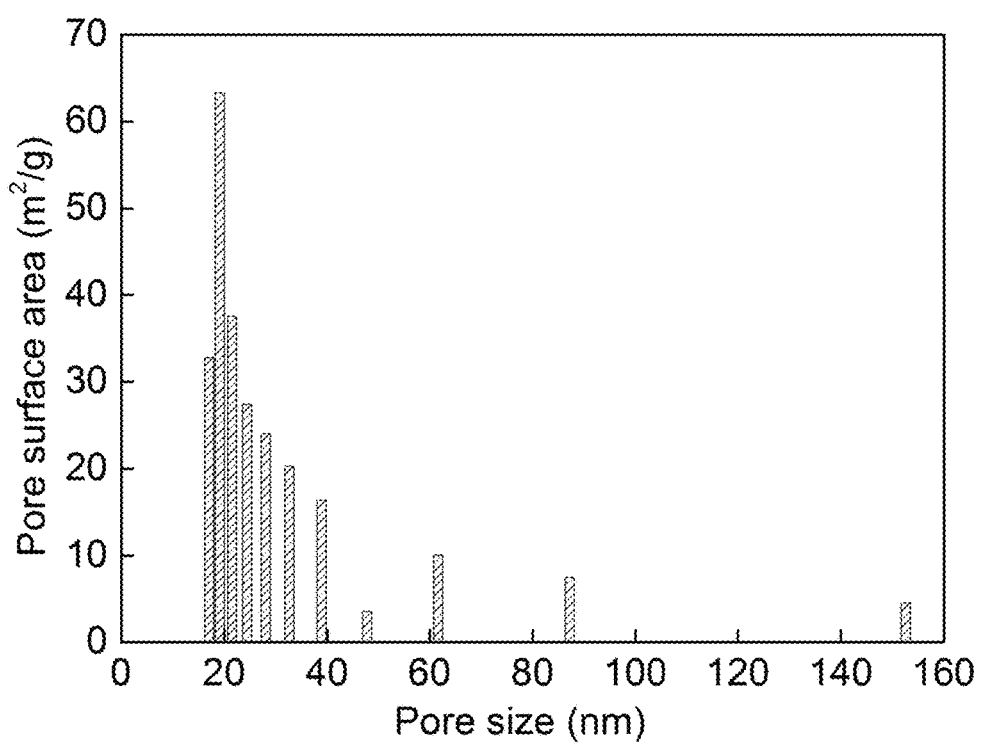
FIG. 22 shows BJH pore size distribution of ABP/Ni/graphene.
Figure 23:
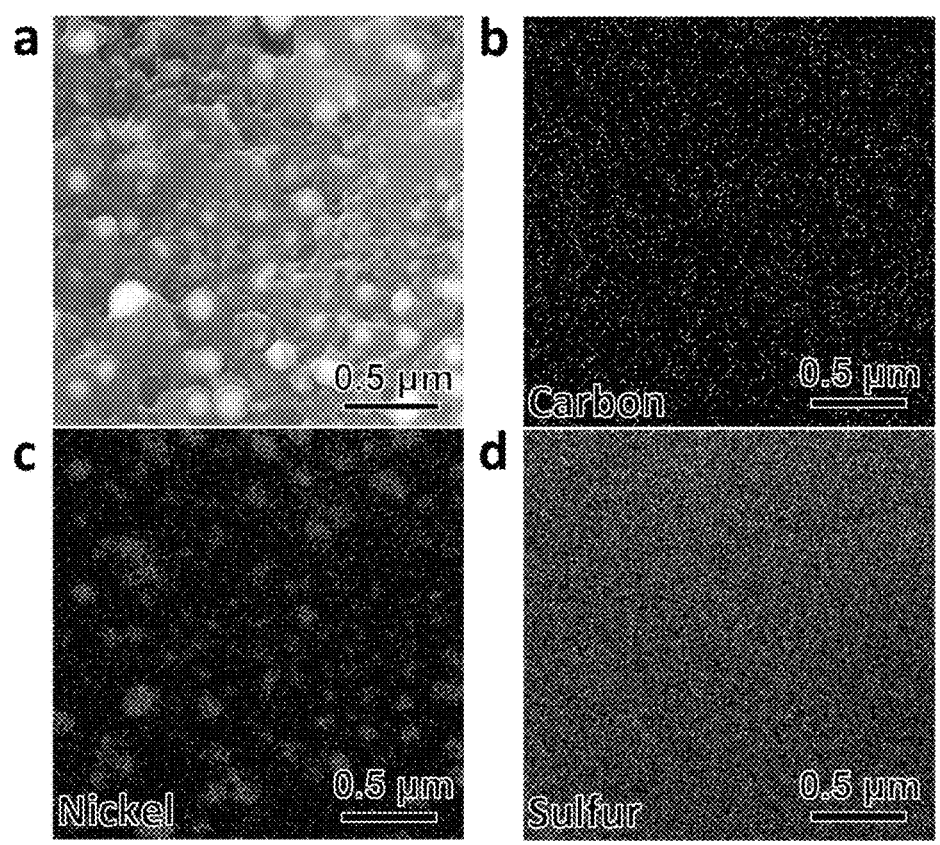
FIG. 23 shows SEM image and element maps of ABP/Ni/graphene/S, (a) SEM image of ABP/Ni/graphene/S; (b) Element map of carbon; (c) Element map of nickel; (d) Element map of sulfur.
Figure 24:
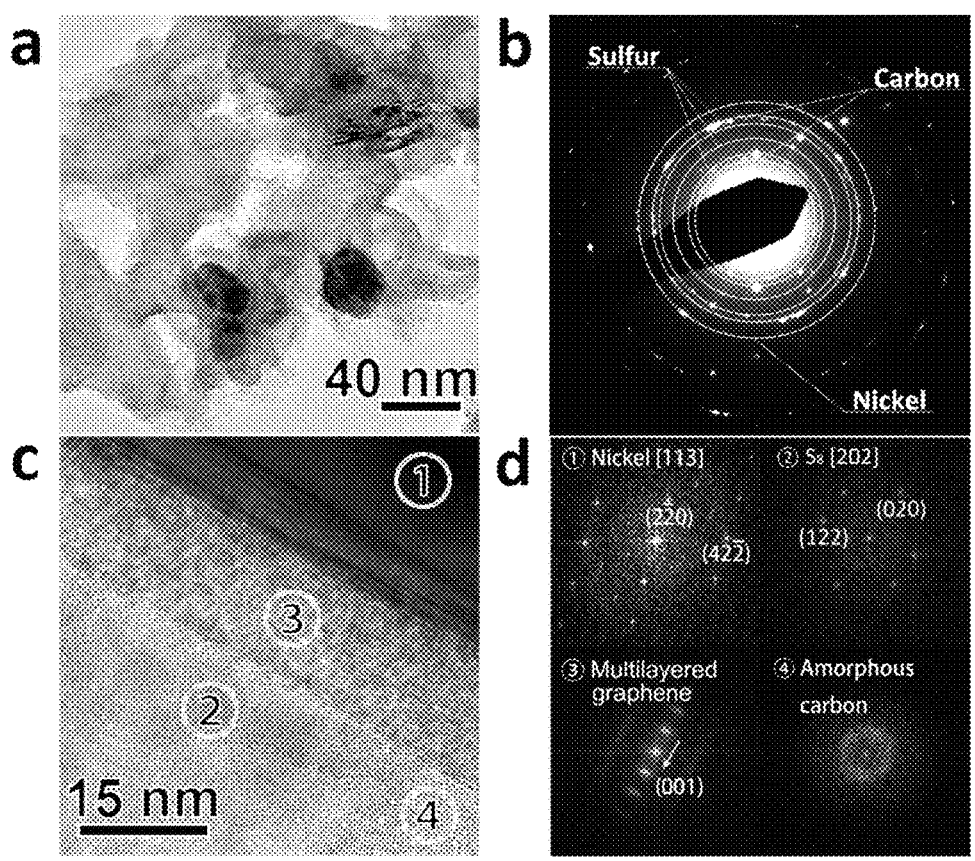
FIG. 24 shows microstructure of ABP/Ni/graphene/S composite, (a) TEM image of ABP/Ni/graphene/S; (b) SAED pattern of a; (c) HRTEM image of ABP/Ni/graphene/S; (d) FFT patterns of areas ①, ②, ③, and ④ in c, showing that the Ni nanoparticles, sulfur nanosphere crystals, multilayered graphene crystal and amorphous carbon jointly construct the ABP/Ni/graphene/S composite.

Sulfur powders were first loaded onto a piece of ABP. The sulfur loaded ABP was then annealed at 155° C. for 12 h and at 200° C. for 2 h to infiltrate sulfur into the pores of ABP and coat a sulfur layer on the ABP surface without agglomeration (FIG. 19). The sulfur loading was measured to be ~2.3 mg cm$^{-2}$, which is comparable with that reported in literatures. This may be ascribed to the hierarchically porous structure in ABP that enhanced sulfur loading. The ABP/S (as the cathode) was assembled with lithium (as the anode) into a Li—S battery. This Li-ABP/S battery achieved a specific capacity of 1205 mAh g$^{-1}$ at 0.04 C in the first discharge (FIG. 20). In the second cycle, however, the capacity dropped abruptly down to ~600 mAh After 50 cycles, the capacity stabilized at ~450 mAh To overcome the fast capacity decay and the low utilization of sulfur, we created nanosized pores and deposited Ni nanoparticles simultaneously on the cell walls of ABP via a simple, low cost chemical route using Ni(NO$_3$)$_2$ solution. Without being held to a particular theory, we believe that the Ni(NO$_3$)$_2$ treated ABP decomposed into the following products during the heat treatment at 1000° C.:

$$Ni(NO_3)_2 \cdot 2H_2O \rightarrow Ni(NO_3)(OH)_2 \cdot H_2O + NO_2 \quad (1)$$

$$Ni(NO_3)(OH)_{1.5}O_{0.25} \cdot H_2O \rightarrow 0.5Ni_2O_3 + HNO_3 + 1.25H_2O \quad (2)$$

$$3Ni_2O_3 \rightarrow 2Ni_3O_4 + 0.5O_2 \quad (3)$$

$$Ni_3O_4 \rightarrow 3NiO + 0.5O_2 \quad (4)$$

$$NiO + C \rightarrow Ni + CO \quad (5)$$

$$NiO + CO \rightarrow Ni + CO_2 \quad (6)$$

Among the decomposed products, the corrosive HNO$_3$ vapors etched the ABP surface, creating nanoporous structure with an average pore size of 30 nm while the original cell structure remained (FIGS. 21a,b). A close-up inspection of the Ni(NO$_3$)$_2$ treated ABP revealed that Ni nanoparticles were embedded in nano carbon rings (FIG. 21c). In addition to Ni and amorphous C, the SAED pattern validated the existence of C crystal (FIG. 21d). High resolution TEM (HRTEM) image shows that Ni nanoparticles were wrapped with multilayered graphene (FIGS. 21e, f). At high temperature, the C atoms from ABP dissolved into Ni. When the sample cooled down to room temperature, the C atoms precipitated out and segregated on the Ni nanoparticle surface, forming multilayered graphene shell. This ABP/Ni/graphene composite demonstrates an improved conductivity with a sheet resistance of 7.4 Ωsq$^{-1}$. Without being held to a particular theory, we believe that the conductivity improvement can be ascribed to the graphene-wrapped-Ni-nanoparticles because nickel and graphene are both excellent conductors. The ABP/Ni/graphene has a specific area of 474 m$^2$ g$^{-1}$, 2.5 times larger than ABP (194 m$^2$ g$^{-1}$). The Barrett-Joyner-Halenda (BJH) pore size distribution (FIG. 22) shows that most of the pores in the ABP/Ni/graphene are less than 40 nm, in good agreement with the SEM observation (FIG. 21b).

Figure 25:
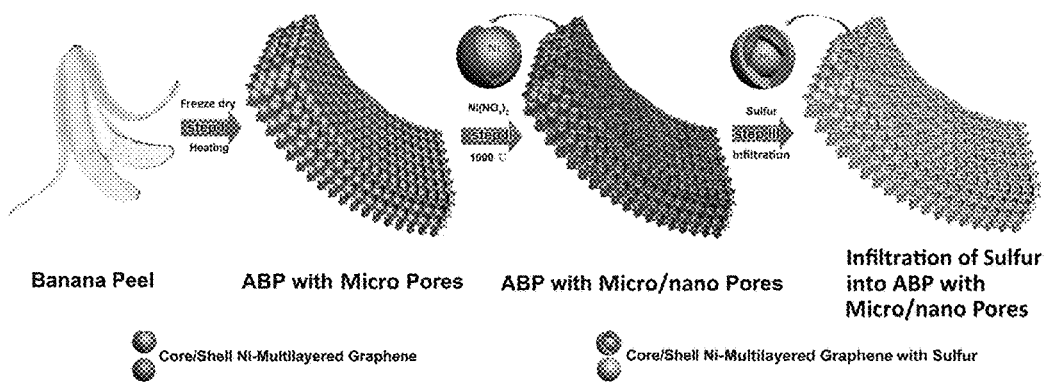
FIG. 25 shows schematic diagram of the detailed processes to convert a banana peel into the ABP/Ni/graphene/S composite.
Figure 26:
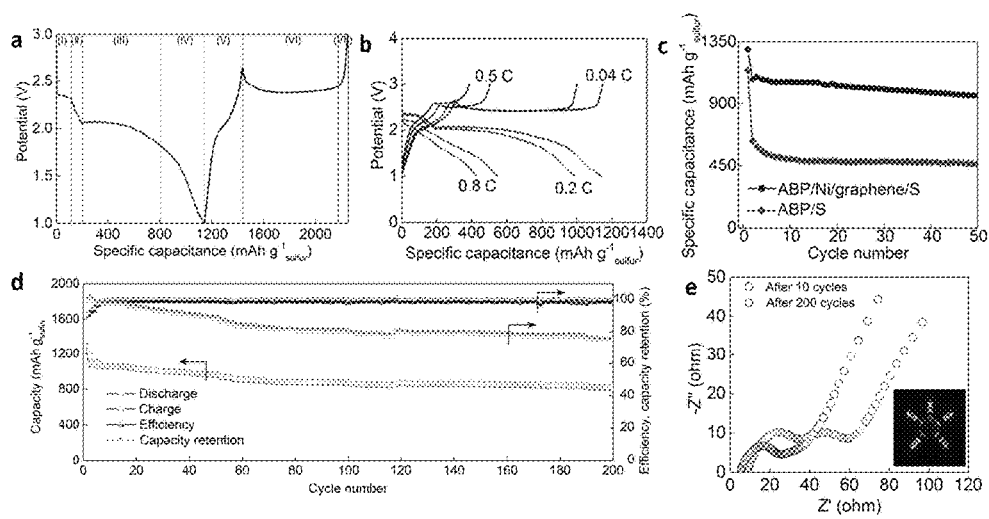
FIG. 26 shows electrochemical performance of Li-ABP/Ni/graphene/S battery, (a) Charge/discharge curve of Li-ABP/Ni/graphene/S battery; (b) Charge/discharge curves of Li-ABP/Ni/graphene/S battery at different rates; (c) Cycle ability of Li-ABP/Ni/graphene/S battery with reference to Li-ABP/S battery; (d) Cycling performance of Li-ABP/Ni/graphene/S battery. (e) Nyquist plot of Li-ABP/Ni/graphene/S battery under fully charging state before and after 200 cycles (inset: the Li-ABP/Ni/graphene/S battery can enlighten multiple LEDs).
Figure 27:
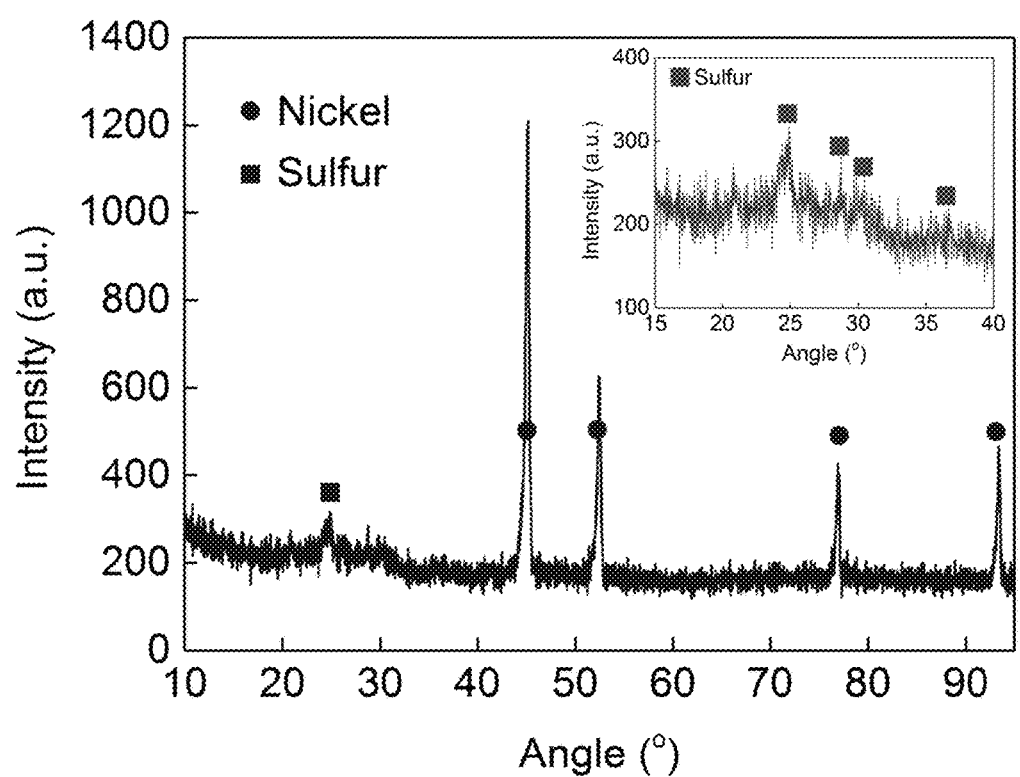
FIG. 27 shows XRD spectrum of ABP/Ni/graphene/S.

Next, we used the ABP/Ni/graphene composite to load sulfur. Sulfur was homogeneously anchored on the ABP/Ni/graphene scaffold with the sulfur loading of 4.3 mg cm$^{-2}$ (FIG. 23), which is approximately two times higher than that of the untreated ABP (2.3 mg cm$^{-2}$). The enhancement of sulfur loading can be ascribed to the nanopores in the composite, which offer more sites for sulfur storage. Low magnification TEM image (FIG. 24a) exhibits that sulfur filled into carbon rings in FIG. 3c. The corresponding SAED pattern validates the existence of sulfur polycrystals (FIG. 24b). The close-up HRTEM inspection (FIG. 24c) unveils that the Ni nanoparticles were coated with multilayered graphene (inner shell) and polycrystalline sulfur (outer shell). The outer sulfur shell contains nanosphere S crystals with the size of 5 nm embedded in the amorphous C (FIG. 24c). The corresponding FFT patterns (FIG. 24d) confirmed that Ni nanoparticles, sulfur nanosphere crystals, multilayered graphene crystal and amorphous carbon jointly construct the ABP/Ni/graphene/S composite, which is consistent with XRD result (FIG. 27). The close contact between sulfur, graphene, Ni and ABP in cellulose architecture is expected to increase conductivity and facilitate ion diffusion and electron transfer, therefore jointly enhancing the electrochemical performance of Li-ABP/Ni/graphene/S batteries. FIG. 25 shows the detailed processes to convert a banana peel into the ABP/Ni/graphene/S composite.

The ABP/Ni/graphene/S (as the cathode) and lithium (as the anode) were assembled into a high-performance Li—S battery. FIG. 26a shows the typical charge/discharge curve of the Li-ABP/Ni/graphene/S battery. Four stages appear to exist during discharge process (Stage I to IV in FIG. 26a), which can be respectively ascribed to the formation of S$_3^{\bullet-}$ radical anion (Stage I: plateau at 2.3 V), the formation of high-order polysulfides from S$_3^{\bullet-}$ (Stage II: dip between 2.3-2.1 V), the transformation between S$_4^{2-}$ and S$^{2-}$ (Stage III: plateau at 2.1 V), and the formation of solid Li$_2$S (Stage IV: dip between 2.1-1.5 V). The charge process can be grouped into 3 stages (Stage V to VII in FIG. 26a). The first stage of charge process (Stage V) represents the conversion from solid Li$_2$S to soluble low-order polysulfide (S$_2^2$). The plateau at 2.3-2.4 V (Stage VI) can be ascribed to the transformation between low-order polysulfide (S$_2^{2-}$ or S$_4^{2-}$) to high-order polysulfides (S$_8^{2-}$ or S$_6^{2-}$). The last step of charge process (Stage VII in FIG. 26a) is a quick ascendence of voltage from 2.4 V to 2.8 V, indicating the transformation of high-order polysulfides back to solid sulfur. It is noteworthy that the last stage (Stage IV) of the discharge process and the first stage of the charge process (Stage V) both exhibited gentle slopes, rather than an abrupt dip or sudden jump which were often reported in Li—S batteries. The gentle slopes in Stages IV and V are ascribed to the 3D hierarchically porous structure of ABP, in which the sulfur stored in the pores slowed down capacity decay. No NiS$_2$ formed (FIG. 24 and FIG. 25) because the multilayered graphene obstructed the reactions between nickel and sulfur during charge/discharge cycling.

It is especially recognized that the Li-ABP/Ni/graphene/S battery exhibited good rate ability (FIG. 26b). At a relatively low rate of 0.04 C its specific capacity achieved 1183.5 mAh g$^{-1}$. When the charge/discharge rate was raised up to 0.8 C its specific capacity was still kept above 400 mAh g$^{-1}$. However, further pushing up the rate led to distorted charge/discharge curves. The plateau at 2.0 V in the discharge curve (Stage I) reduced down to 1.8 V whereas the plateau at 2.2 V in the charge curve (Stage VI) raised up to 2.3 V. Such distortion can be ascribed to the insufficient electrochemical reactions and high internal resistance, jointly leading to a higher over-potential but lower capacity in the high current density regime. Cycling life and coulombic efficiency are two critical factors for evaluating the practical applications of a battery. Unlike the Li-ABP/S battery, the assembled Li-ABP/Ni/graphene/S battery did not show abrupt capacity decay in the second cycle, suggesting better capacity retention (FIG. 26c). Without being held to a particular theory, we believe that the superior capacity retention is ascribed to the synergetic effects of Ni nanoparticles, graphene, and nanopores in cellulose architecture. In the Li—S battery, the stable $S_3^{\bullet-}$ radical anions play a key role because they are very active and can transfer into the electrolyte. Other high order polysulfides ($S_8^{2-}$, $S_6^{2-}$, and $S_4^{2-}$) are either passive phases or semisolids, which can easily accumulate on the surface of the cathode, blocking the pathway between the electrode, active material, and electrolyte. The micro/nanopores in ABP/Ni/graphene/S cathode were able to encapsulate and immobilize sulfur chains, ensuring the local chemical environment suitable for more stable $S_3^{\bullet-}$ radical anions as well as avoiding the shuttle effect. Encouragingly, the Li-ABP/Ni/graphene/S battery exhibited eminent cyclic performance with a recovery of capacity of 832.4 mAh g$^{-1}$ at 0.2 C after 200 cycles. With the exception of the first few cycles, the ABP/Ni/S-based Li—S battery exhibited excellent coulombic efficiency of almost 100% even after 200 cycles (FIG. 26d), indicating outstanding coulombic efficiency.

EIS measurements were also carried out to further investigate the electrochemical performance of the assembled Li-ABP/Ni/graphene/S battery. As shown in FIG. 26e, at the early stage of cycling (10th cycle), two semicircles appeared in the high frequency regime. The first one at the relatively higher frequency resulted from the deposition of a passive film on the surface of lithium electrode, the other one at the relatively lower frequency arose from the migration of lithium ions through the solid-electrolyte-interphase (SEI) film. The straight line in the low frequency regime was the result of the Li ion diffusion. For the 200th cycle the second semicircle disappeared, indicating that the SEI film had cracked (FIG. 26e). The fracture of the SEI film in turn accelerated the corrosion of Li anode, resulting in malfunction or entire failure of the battery. The straight lines in the low frequency regime for the 10th and 200th cycles were alike, pointing towards excellent Li ion diffusion. This banana-peel derived battery is able to enlighten multiple LEDs (see the inset in FIG. 26e). It is noteworthy that the hierarchically porous architecture contributed remarkably to the exceptional electrochemical performance of the Li-ABP/Ni/graphene/S battery. The porous foam-like structure accommodated the volume change during the transformation between sulfur and polysulfides, suppressed the formation of passive films which might impede the electrochemical reactions, mitigated dissolution of polysulfides via trapping and encapsulating multi-atom sulfur chains, and shortened the pathway of ion transfer. Moreover, the highly conductive Ni/graphene core/shell nanoparticles further facilitated ion transport and electron transfer, while the graphene shell blocked the possible reactions between nickel and sulfur, reducing internal resistance and enhance coulombic efficiency. Considering economic and social benefits of recycling banana peels, such low cost biomass-based activated porous carbon holds an unprecedented promise for energy storage application.

In one embodiment, banana peels were successfully converted into hierarchically porous activated carbon scaffolds for energy storage applications. Urchin-like NiCo$_2$O$_4$ nanowires were uniformly anchored on the surface of ABP through a mild hydrothermal process. ABP (as the negative electrode) and NiCo$_2$O$_4$/ABP (as the positive electrode) were assembled into a high performance asymmetric supercapacitor. Such banana-peel derived asymmetric supercapacitor exhibited eminent specific capacitance, high power density and competitive cycling robustness. In another embodiment, annealing Ni(NO$_3$)$_2$ treated ABP created nanopores and graphene wrapped Ni nanoparticles simultaneously on the cell walls of ABP. The hierarchically porous ABP/Ni/graphene architecture accommodated the volume change during the charge/discharge cycling, suppressed the formation of passive layer, mitigated dissolution of polysulfides via trapping and encapsulating multi-atom sulfur chains, and shortened the pathway of ion transfer. Moreover, the highly conductive Ni nanoparticles and graphene further enhanced electron transfer, ensuring low internal resistance and high coulombic efficiency. The banana-peel derived supercapacitors and batteries may lead to high performance energy storage devices while reducing material waste.

What is claimed is:

1. A process for making a flexible electrode, comprising preparing a cotton textile containing Ni(NO$_3$)$_2$;
   heating the cotton textile containing Ni(NO$_3$)$_2$ at a first temperature to produce an activated cotton textile composite comprising activated carbon fibers, nickel nanoparticles and graphene; and
   treating the activated cotton textile composite comprising activated carbon fibers, nickel nanoparticles and graphene with sulfur to produce an activated cotton textile composite comprising activated carbon fibers, nickel sulfide nanoparticles and graphene.

2. The process of claim 1, wherein the activated carbon fibers have a tubular structure.

3. The process of claim 1, wherein the cotton textile containing Ni(NO$_3$)$_2$ is prepared by dipping a cotton textile into a Ni(NO$_3$)$_2$ solution.

4. The process of claim 3, wherein a concentration of the Ni(NO$_3$)$_2$ solution is in a range of 0.01 M to 1M.

5. The process of claim 3, wherein the cotton textile is dipped into the Ni(NO$_3$)$_2$ solution for at least 10 minutes.

6. The process of claim 1, wherein the cotton textile containing Ni(NO$_3$)$_2$ is heated at the first temperature within a range of 900 to 1000° C..

7. The process of claim 4, wherein the cotton textile containing Ni(NO$_3$)$_2$ is heated at the first temperature under an inert environment for a time within a range of 60 to 90 minutes.

8. The process of claim 1, wherein the treating step comprises:
   coating the activated cotton textile composite comprising activated carbon fibers, nickel nanoparticles and graphene with a layer of sulfur;
   heating the activated carbon textile composite at a second temperature to produce the activated cotton textile composite comprising activated carbon fibers, nickel sulfide nanoparticles and graphene.

9. The process of claim 8, wherein the coating of the cotton textile composite is performed by dropping a solution comprising sulfur onto a surface of the activated cotton textile composite comprising activated carbon fibers, nickel nanoparticles and graphene.

10. The process of claim 8, wherein an amount of the sulfur is at least two times of an amount of nickel by weight on the coated activated cotton textile composite comprising activated carbon fibers, nickel nanoparticles and graphene.

11. The process of claim 8, wherein the activated carbon textile composite is heated at the second temperature within a range of 900 to 1000° C. for a time within a range of 60 to 90 minutes.

12. The process of claim 1, wherein the nickel sulfide particles are NiS$_2$ nanoparticles.

13. The process of claim 11, wherein the NiS$_2$ particles are in a form of nanobowls.

14. An activated cotton textile composite, comprising
an activated cotton textile composed of activated carbon fibers;
nickel sulfide nanoparticles;
and graphene.

15. The activated cotton textile composite of claim 14, wherein the nickel sulfide nanoparticles are distributed on a surface and inside the activated carbon fibers, and the activated carbon fibers and the nickel sulfide nanoparticles are coated with graphene.

16. The activated cotton textile composite of claim 14, wherein the activated carbon fibers have a tubular structure.

17. The activated cotton textile composite of claim 14, wherein the nickel sulfide nanoparticles are $NiS_2$ nanoparticles.

18. The activated cotton textile composite of claim 17, wherein the $NiS_2$ nanoparticles are in a form of nanobowls.

19. The activated cotton textile composite of claim 17, wherein the $NiS_2$ particles have an average size of about 50 to 200 nm.

20. The activated cotton textile composite rode of claim 14, wherein the activated cotton textile composite has a BET surface area of at least 528 $m^2g^{-1}$.

21. The activated cotton textile composite of claim 14, wherein the activated cotton textile composite has pores having a size distribution ranging from 2 to 32 nm, and an average pore radius of about 5 to 15 nm.

22. The activated cotton textile composite of claim 14, wherein an amount of the nickel sulfide nanoparticles and the graphene on the activated cotton textile composite is in a range of 25 to 30 percent by weight.

23. A flexible electrode comprising the activated cotton textile composite of claim 14.

24. The flexible electrode of claim 23, wherein the flexible electrode has an initial discharge capacity of at least 1710 mAh $g^{-1}$ at a rate of 0.01 C, a discharge capacitance of at least 608 mAh $g^{-1}$ after 100 cycles at a rate of 1 C, and a recovered discharge capacitance of at least 1016 mAh $g^{-1}$ after 400 cycles at a rate of 0.1 C.

25. A flexible battery employing the flexible electrode of claim 23.

* * * * *